US012647974B2

(12) United States Patent
Abdelghaffar et al.

(10) Patent No.: US 12,647,974 B2
(45) Date of Patent: Jun. 2, 2026

(54) UPLINK SPATIAL RELATION INFORMATION IN SUBBAND FULL DUPLEX

(71) Applicant: QUALCOMM Incorporated, San Diego, CA (US)

(72) Inventors: Muhammad Sayed Khairy Abdelghaffar, San Jose, CA (US); Qian Zhang, Basking Ridge, NJ (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/416,357

(22) Filed: Jan. 18, 2024

(65) Prior Publication Data

US 2024/0357582 A1     Oct. 24, 2024

Related U.S. Application Data

(60) Provisional application No. 63/496,624, filed on Apr. 17, 2023.

(51) Int. Cl.
*H04W 72/1268*     (2023.01)
*H04L 5/14*     (2006.01)

(52) U.S. Cl.
CPC ........... *H04W 72/1268* (2013.01); *H04L 5/14* (2013.01)

(58) Field of Classification Search
CPC .............................. H04W 72/1268; H04L 5/14
See application file for complete search history.

(56) References Cited

U.S. PATENT DOCUMENTS

2022/0416872 A1     12/2022     Zhang et al.
2023/0276434 A1*    8/2023     Ibrahim ................ H04L 5/1461
                                                                      370/329

(Continued)

FOREIGN PATENT DOCUMENTS

EP                 4657939 A1 *  12/2025  ........... H04L 5/0094
WO        WO-2020237650 A1    12/2020
WO        WO-2021217298 A1    11/2021

OTHER PUBLICATIONS

International Search Report and Written Opinion—PCT/US2024/019720—ISA/EPO—Jun. 18, 2024.

*Primary Examiner* — Kenny S Lin
(74) *Attorney, Agent, or Firm* — Holland & Hart LLP

(57)     ABSTRACT

Methods, systems, and devices for wireless communications are described. A user equipment (UE) may perform or cancel an uplink transmission in a subband full duplex (SBFD) resource based on whether the indicated uplink beam is enabled or restricted for SBFD. A network entity may monitor for or refrain from monitoring for an uplink transmission in an SBFD resource based on whether the indicated uplink beam is enabled or restricted for SBFD. A UE may be configured with a first uplink beam for half-duplex uplink resources and a second uplink beam for SBFD resources. The UE may perform uplink transmissions scheduled in SBFD resources using the first uplink beam. A UE may use a single uplink beam configured for both half-duplex uplink resources and SBFD resources, or a single uplink beam may be configured and restricted from SBFD resources, and the UE may cancel a scheduled transmission in an SBFD resource.

30 Claims, 15 Drawing Sheets

(56) References Cited

U.S. PATENT DOCUMENTS

| | | | |
|---|---|---|---|
| 2023/0292294 A1* | 9/2023 | Rudolf | H04W 72/0446 |
| 2023/0421341 A1* | 12/2023 | Ibrahim | H04W 72/23 |
| 2024/0107516 A1* | 3/2024 | Zhou | H04W 72/1263 |
| 2024/0147277 A1* | 5/2024 | Zhang | H04W 24/10 |
| 2024/0147433 A1* | 5/2024 | Zhang | H04L 5/14 |
| 2024/0283602 A1* | 8/2024 | Ibrahim | H04L 5/0051 |
| 2024/0348415 A1* | 10/2024 | Abdelghaffar | H04B 17/336 |

* cited by examiner

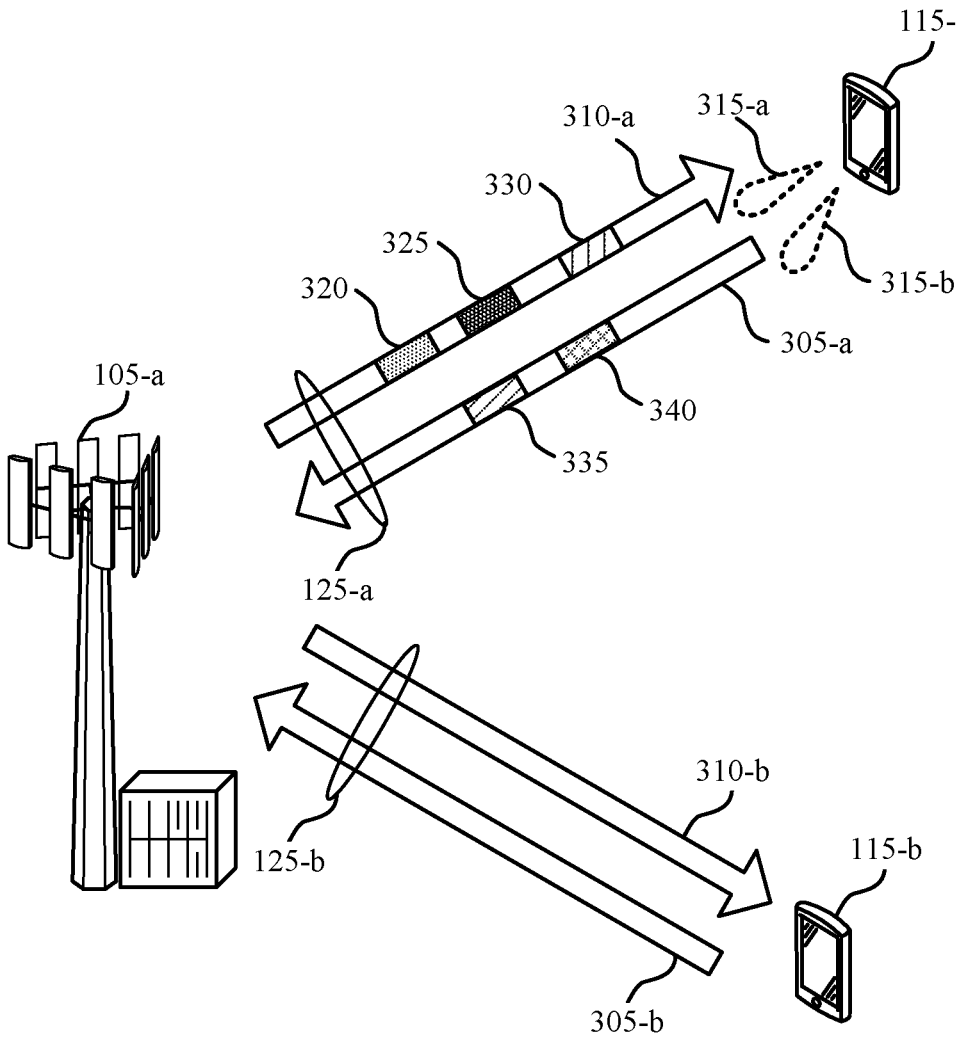
FIG. 3

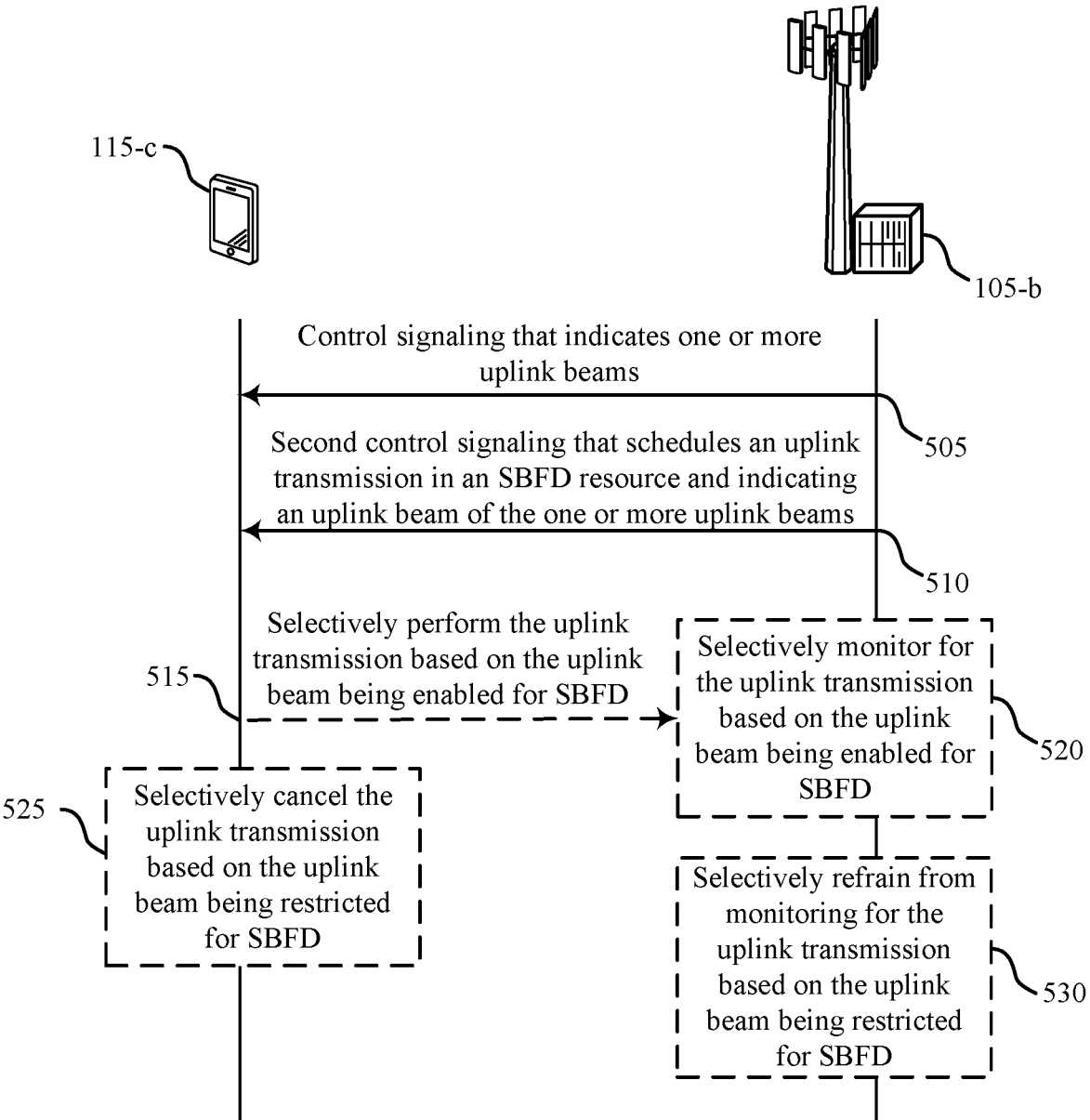

115-c 105-b

Control signaling that indicates one or more uplink beams

505

Second control signaling that schedules an uplink transmission in an SBFD resource and indicating an uplink beam of the one or more uplink beams

510

Selectively perform the uplink transmission based on the uplink beam being enabled for SBFD

515

Selectively monitor for the uplink transmission based on the uplink beam being enabled for SBFD

520

Selectively cancel the uplink transmission based on the uplink beam being restricted for SBFD

525

Selectively refrain from monitoring for the uplink transmission based on the uplink beam being restricted for SBFD

Network
Entity

Transceiver

1310

Antenna

1315

Communications
Manager

1320

Memory

Code

1330

1325

1340

Processor

1335

1305

1300

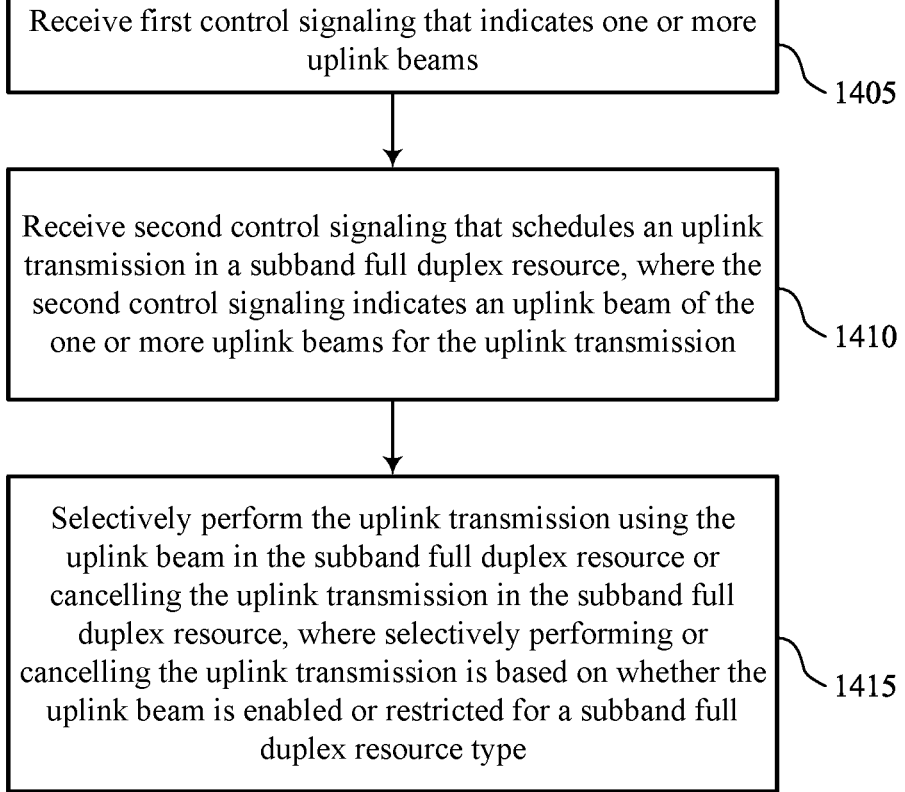

Receive first control signaling that indicates one or more uplink beams

1405

Receive second control signaling that schedules an uplink transmission in a subband full duplex resource, where the second control signaling indicates an uplink beam of the one or more uplink beams for the uplink transmission

1410

Selectively perform the uplink transmission using the uplink beam in the subband full duplex resource or cancelling the uplink transmission in the subband full duplex resource, where selectively performing or cancelling the uplink transmission is based on whether the uplink beam is enabled or restricted for a subband full duplex resource type

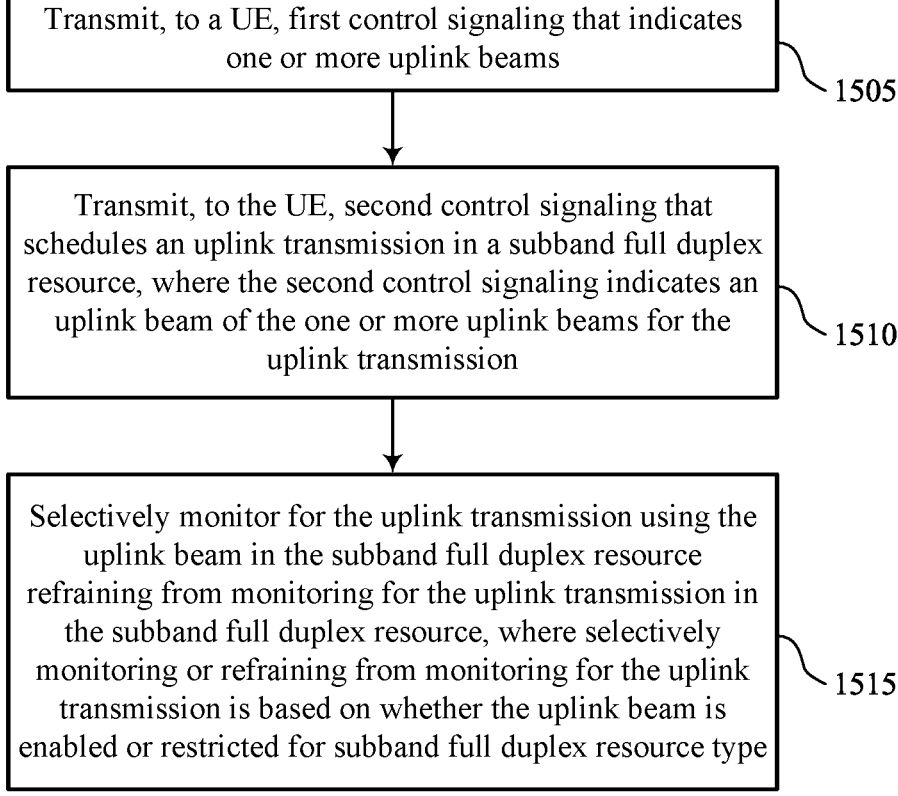

Transmit, to a UE, first control signaling that indicates one or more uplink beams

1505

Transmit, to the UE, second control signaling that schedules an uplink transmission in a subband full duplex resource, where the second control signaling indicates an uplink beam of the one or more uplink beams for the uplink transmission

1510

Selectively monitor for the uplink transmission using the uplink beam in the subband full duplex resource refraining from monitoring for the uplink transmission in the subband full duplex resource, where selectively monitoring or refraining from monitoring for the uplink transmission is based on whether the uplink beam is enabled or restricted for subband full duplex resource type

UPLINK SPATIAL RELATION INFORMATION IN SUBBAND FULL DUPLEX

CROSS REFERENCE

The present application for patent claims the benefit of U.S. Provisional Patent Application No. 63/496,624 by ABDELGHAFFAR et al., entitled "UPLINK SPATIAL RELATION INFORMATION IN SUBBAND FULL DUPLEX," filed Apr. 17, 2023, assigned to the assignee hereof, and expressly incorporated by reference in its entirety herein.

FIELD OF TECHNOLOGY

The following relates to wireless communications, including uplink spatial relation information in subband full duplex.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support uplink spatial relation information in subband full duplex (SBFD). For example, the described techniques provide for selective performance or cancellation, by a user equipment (UE), of an uplink transmission in an SBFD resource based on whether the indicated uplink beam for the uplink transmission is enabled or restricted for SBFD resources. Similarly, the network entity may selectively monitor for or refrain from monitoring for an uplink transmission from a UE in an SBFD resource based on whether the indicated uplink beam for the uplink transmission is enabled or restricted for SBFD resources. For example, a UE may be configured with two uplink spatial relations (e.g., two uplink beams), one configured for half-duplex (HD) uplink resources and one configured for SBFD resources. In such cases, the UE may communicate uplink transmissions scheduled in SBFD resources using the configured uplink beam for SBFD resources and the UE may communicate uplink transmissions scheduled in HD uplink resources using the configured uplink beam for HD uplink resources. In some aspects, only a single uplink beam may be configured for the UE, and the network may indicate to the UE that the UE may use the uplink beam for both HD uplink resources and SBFD resources. In some aspects, only a single uplink beam may be configured and the single beam may be restricted for SBFD resources. In such aspects, the UE may drop or cancel a scheduled transmission in an SBFD resource.

A method for wireless communications at a UE is described. The method may include receiving first control signaling that indicates one or more uplink beams, receiving second control signaling that schedules an uplink transmission in a SBFD resource, where the second control signaling indicates an uplink beam of the one or more uplink beams for the uplink transmission, and selectively performing the uplink transmission using the uplink beam in the SBFD resource or cancelling the uplink transmission in the SBFD resource, where selectively performing or cancelling the uplink transmission is based on whether the uplink beam is enabled or restricted for a SBFD resource type.

A UE for wireless communications is described. The UE may include one or more memories storing processor executable code, and one or more processors coupled with the one or more memories. The one or more processors may individually or collectively operable to execute the code to cause the UE to receive first control signaling that indicates one or more uplink beams, receive second control signaling that schedules an uplink transmission in a SBFD resource, where the second control signaling indicates an uplink beam of the one or more uplink beams for the uplink transmission, and selectively perform the uplink transmission using the uplink beam in the SBFD resource or cancelling the uplink transmission in the SBFD resource, where selectively performing or cancelling the uplink transmission is based on whether the uplink beam is enabled or restricted for a SBFD resource type.

An apparatus for wireless communications at a UE is described. The apparatus may include means for receiving first control signaling that indicates one or more uplink beams, means for receiving second control signaling that schedules an uplink transmission in a SBFD resource, where the second control signaling indicates an uplink beam of the one or more uplink beams for the uplink transmission, and means for selectively performing the uplink transmission using the uplink beam in the SBFD resource or cancelling the uplink transmission in the SBFD resource, where selectively performing or cancelling the uplink transmission is based on whether the uplink beam is enabled or restricted for a SBFD resource type.

A non-transitory computer-readable medium storing code for wireless communications at a UE is described. The code may include instructions executable by a processor to receive first control signaling that indicates one or more uplink beams, receive second control signaling that schedules an uplink transmission in a SBFD resource, where the second control signaling indicates an uplink beam of the one or more uplink beams for the uplink transmission, and selectively perform the uplink transmission using the uplink beam in the SBFD resource or cancelling the uplink transmission in the SBFD resource, where selectively performing or cancelling the uplink transmission is based on whether the uplink beam is enabled or restricted for a SBFD resource type.

In some examples of the method, apparatuses, and non-transitory computer-readable medium described herein, receiving the first control signaling may include operations, features, means, or instructions for receiving an indication that the one or more uplink beams include the uplink beam enabled for the SBFD resource type and a second uplink beam enabled for an uplink resource type.

In some examples of the method, apparatuses, and non-transitory computer-readable medium described herein, receiving the indication that the one or more uplink beams include the uplink beam enabled for the SBFD resource type and the second uplink beam enabled for the uplink resource type may include operations, features, means, or instructions for receiving an indication of a first spatial relation associated with the SBFD resource type and a second spatial relation associated with the uplink resource type, where the first spatial relation may be indicative of the uplink beam and the second spatial relation may be indicative of the second uplink beam.

In some examples of the method, apparatuses, and non-transitory computer-readable medium described herein, receiving the indication that the one or more uplink beams include the uplink beam enabled for the SBFD resource type and the second uplink beam enabled for the uplink resource type may include operations, features, means, or instructions for receiving an indication of a spatial relation associated with both the SBFD resource type and the uplink resource type, where the spatial relation includes a first reference signal field associated with the SBFD resource type and a second reference signal field associated with the uplink resource type, where the first reference signal field may be indicative of the uplink beam and the second reference signal field may be indicative of the second uplink beam.

Some examples of the method, apparatuses, and non-transitory computer-readable medium described herein may further include operations, features, means, or instructions for receiving third control signaling scheduling a second uplink transmission in an uplink resource, performing the uplink transmission using the uplink beam in the SBFD resource, and performing the second uplink transmission using the second uplink beam in the uplink resource.

Some examples of the method, apparatuses, and non-transitory computer-readable medium described herein may further include operations, features, means, or instructions for receiving third control signaling indicating the uplink beam may be enabled for the SBFD resource type and that a second beam of the one or more uplink beams may be enabled for an uplink resource type.

In some examples of the method, apparatuses, and non-transitory computer-readable medium described herein, receiving the second control signaling may include operations, features, means, or instructions for receiving an indication of a first sounding reference signal (SRS) resource indicator (SRI) or a first transmission configuration indicator (TCI) state associated with the SBFD resource type and a second SRI or a second TCI state associated with an uplink resource type, where the first SRI or the first TCI state may be indicative of the uplink beam and the second SRI or the second TCI state may be indicative of a second uplink beam of the one or more uplink beams, and where the uplink transmission may be an uplink shared channel transmission.

Some examples of the method, apparatuses, and non-transitory computer-readable medium described herein may further include operations, features, means, or instructions for receiving, with the second control signaling, scheduling information for a set of uplink shared channel repetitions including a first repetition in the SBFD resource and a second repetition in an uplink resource, where the uplink shared channel transmission may be the first repetition, performing the first repetition using the uplink beam in the SBFD resource, and performing the second repetition using the second uplink beam in the uplink resource.

In some examples of the method, apparatuses, and non-transitory computer-readable medium described herein, receiving the second control signaling may include operations, features, means, or instructions for receiving a configured grant (CG) that schedules the uplink shared channel transmission in the SBFD resource and a second uplink shared channel transmission in an uplink resource, where the uplink shared channel transmission may be performed using the uplink beam in the SBFD resource, and where the second uplink shared channel transmission may be performed using the second uplink beam in the uplink resource.

Some examples of the method, apparatuses, and non-transitory computer-readable medium described herein may further include operations, features, means, or instructions for receiving, with the second control signaling, scheduling information for a second uplink shared channel transmission in an uplink resource, where the second control signaling may be a single downlink control information (DCI), performing the uplink shared channel transmission using the uplink beam in the SBFD resource, and performing the second uplink shared channel transmission using the second uplink beam in the uplink resource.

Some examples of the method, apparatuses, and non-transitory computer-readable medium described herein may further include operations, features, means, or instructions for performing the uplink transmission using the uplink beam in the SBFD resource, where the one or more uplink beams includes only the uplink beam, and where the uplink beam may be enabled for both the SBFD resource type and an uplink resource type.

Some examples of the method, apparatuses, and non-transitory computer-readable medium described herein may further include operations, features, means, or instructions for cancelling the uplink transmission in the SBFD resource, where the one or more uplink beams includes only the uplink beam, and where the uplink beam may be enabled for an uplink resource type and may be restricted for the SBFD resource type.

Some examples of the method, apparatuses, and non-transitory computer-readable medium described herein may further include operations, features, means, or instructions for performing the uplink transmission using the uplink beam in the SBFD resource, where the uplink transmission may be one of an SRS or an uplink control channel transmission.

A method for wireless communications at a network entity is described. The method may include transmitting, to a UE, first control signaling that indicates one or more uplink beams, transmitting, to the UE, second control signaling that schedules an uplink transmission in a SBFD resource, where the second control signaling indicates an uplink beam of the one or more uplink beams for the uplink transmission, and selectively monitoring for the uplink transmission using the uplink beam in the SBFD resource or refraining from monitoring for the uplink transmission in the SBFD resource, where selectively monitoring or refraining from monitoring for the uplink transmission is based on whether the uplink beam is enabled or restricted for SBFD resource type.

A network entity for wireless communications is described. The network entity may include one or more memories storing processor executable code, and one or more processors coupled with the one or more memories. The one or more processors may individually or collectively operable to execute the code to cause the network entity to transmit, to a UE, first control signaling that indicates one or more uplink beams, transmit, to the UE, second control signaling that schedules an uplink transmission in a SBFD resource, where the second control signaling indicates an uplink beam of the one or more uplink beams for the uplink transmission, and selectively monitor for the uplink transmission using the uplink beam in the SBFD resource or refrain from monitoring for the uplink transmission in the SBFD resource, where selectively monitoring or refraining from monitoring for the uplink transmission is based on whether the uplink beam is enabled or restricted for SBFD resource type.

An apparatus for wireless communications at a network entity is described. The apparatus may include means for transmitting, to a UE, first control signaling that indicates one or more uplink beams, means for transmitting, to the UE, second control signaling that schedules an uplink transmission in a SBFD resource, where the second control signaling indicates an uplink beam of the one or more uplink beams for the uplink transmission, and means for selectively monitoring for the uplink transmission using the uplink beam in the SBFD resource or refraining from monitoring for the uplink transmission in the SBFD resource, where selectively monitoring or refraining from monitoring for the uplink transmission is based on whether the uplink beam is enabled or restricted for SBFD resource type.

A non-transitory computer-readable medium storing code for wireless communications at a network entity is described. The code may include instructions executable by a processor to transmit, to a UE, first control signaling that indicates one or more uplink beams, transmit, to the UE, second control signaling that schedules an uplink transmission in a SBFD resource, where the second control signaling indicates an uplink beam of the one or more uplink beams for the uplink transmission, and selectively monitor for the uplink transmission using the uplink beam in the SBFD resource or refrain from monitoring for the uplink transmission in the SBFD resource, where selectively monitoring or refraining from monitoring for the uplink transmission is based on whether the uplink beam is enabled or restricted for SBFD resource type.

In some examples of the method, apparatuses, and non-transitory computer-readable medium described herein, transmitting the first control signaling may include operations, features, means, or instructions for transmitting an indication that the one or more uplink beams include the uplink beam enabled for the SBFD resource type and a second uplink beam enabled for an uplink resource type.

In some examples of the method, apparatuses, and non-transitory computer-readable medium described herein, transmitting the indication that the one or more uplink beams include the uplink beam enabled for the SBFD resource type and the second uplink beam enabled for the uplink resource type may include operations, features, means, or instructions for transmitting an indication of a first spatial relation associated with the SBFD resource type and a second spatial relation associated with the uplink resource type, where the first spatial relation may be indicative of the uplink beam and the second spatial relation may be indicative of the second uplink beam.

In some examples of the method, apparatuses, and non-transitory computer-readable medium described herein, transmitting the indication that the one or more uplink beams include the uplink beam enabled for the SBFD resource type and the second uplink beam enabled for the uplink resource type may include operations, features, means, or instructions for transmitting an indication of a spatial relation associated with both the SBFD resource type and the uplink resource type, where the spatial relation includes a first reference signal field associated with the SBFD resource type and a second reference signal field associated with the uplink resource type, where the first reference signal field may be indicative of the uplink beam and the second reference signal field may be indicative of the second uplink beam.

Some examples of the method, apparatuses, and non-transitory computer-readable medium described herein may further include operations, features, means, or instructions for transmitting, to the UE, third control signaling scheduling a second uplink transmission in an uplink resource, monitoring for the uplink transmission using the uplink beam in the SBFD resource, and monitoring for the second uplink transmission using the second uplink beam in the uplink resource.

Some examples of the method, apparatuses, and non-transitory computer-readable medium described herein may further include operations, features, means, or instructions for transmitting, to the UE, third control signaling indicating the uplink beam may be enabled for the SBFD resource type and that a second beam of the one or more uplink beams may be enabled for an uplink resource type.

In some examples of the method, apparatuses, and non-transitory computer-readable medium described herein, transmitting the second control signaling may include operations, features, means, or instructions for transmitting an indication of a first SRI or a first TCI state associated with the SBFD resource type and a second SRI or a second TCI state associated with an uplink resource type, where the first SRI or the first TCI state may be indicative of the uplink beam and the second SRI or the second TCI state may be indicative of a second uplink beam of the one or more uplink beams, and where the uplink transmission may be an uplink shared channel transmission.

Some examples of the method, apparatuses, and non-transitory computer-readable medium described herein may further include operations, features, means, or instructions for transmitting, with the second control signaling, scheduling information for a set of uplink shared channel repetitions including a first repetition in the SBFD resource and a second repetition in an uplink resource, where the uplink shared channel transmission may be the first repetition, monitoring for the first repetition using the uplink beam in the SBFD resource, and monitoring for the second repetition using the second uplink beam in the uplink resource.

Some examples of the method, apparatuses, and non-transitory computer-readable medium described herein may further include operations, features, means, or instructions for transmitting, to the UE, a CG that schedules the uplink shared channel transmission in the SBFD resource and a second uplink shared channel transmission in an uplink resource, where the uplink shared channel transmission may be monitored for using the uplink beam in the SBFD resource, and where the second uplink shared channel transmission may be monitored for using the second uplink beam in the uplink resource.

Some examples of the method, apparatuses, and non-transitory computer-readable medium described herein may further include operations, features, means, or instructions for transmitting, with the second control signaling, scheduling information for a second uplink shared channel transmission in an uplink resource, where the second control signaling may be a single DCI, monitoring for the uplink shared channel transmission using the uplink beam in the SBFD resource, and monitoring for the second uplink shared channel transmission using the second uplink beam in the uplink resource.

Some examples of the method, apparatuses, and non-transitory computer-readable medium described herein may further include operations, features, means, or instructions for monitoring for the uplink transmission using the uplink beam in the SBFD resource, where the one or more uplink beams includes only the uplink beam, and where the uplink beam may be enabled for both the SBFD resource type and an uplink resource type.

Some examples of the method, apparatuses, and non-transitory computer-readable medium described herein may further include operations, features, means, or instructions for refraining from monitoring for the uplink transmission in the SBFD resource, where the one or more uplink beams includes only the uplink beam, and where the uplink beam may be enabled for an uplink resource type and may be restricted for the SBFD resource type.

Some examples of the method, apparatuses, and non-transitory computer-readable medium described herein may further include operations, features, means, or instructions for monitoring for the uplink transmission using the uplink beam in the SBFD resource, where the uplink transmission may be one of an SRS or an uplink control channel transmission.

BRIEF DESCRIPTION OF THE DRAWINGS

FIG. 3 shows an example of a wireless communications system that supports uplink spatial relation information in SBFD in accordance with one or more aspects of the present disclosure.

FIG. 5 shows an example of a process flow that supports uplink spatial relation information in SBFD in accordance with one or more aspects of the present disclosure.

FIGS. 14 and 15 show flowcharts illustrating methods that support uplink spatial relation information in SBFD in accordance with one or more aspects of the present disclosure.

DETAILED DESCRIPTION

Figure 1:
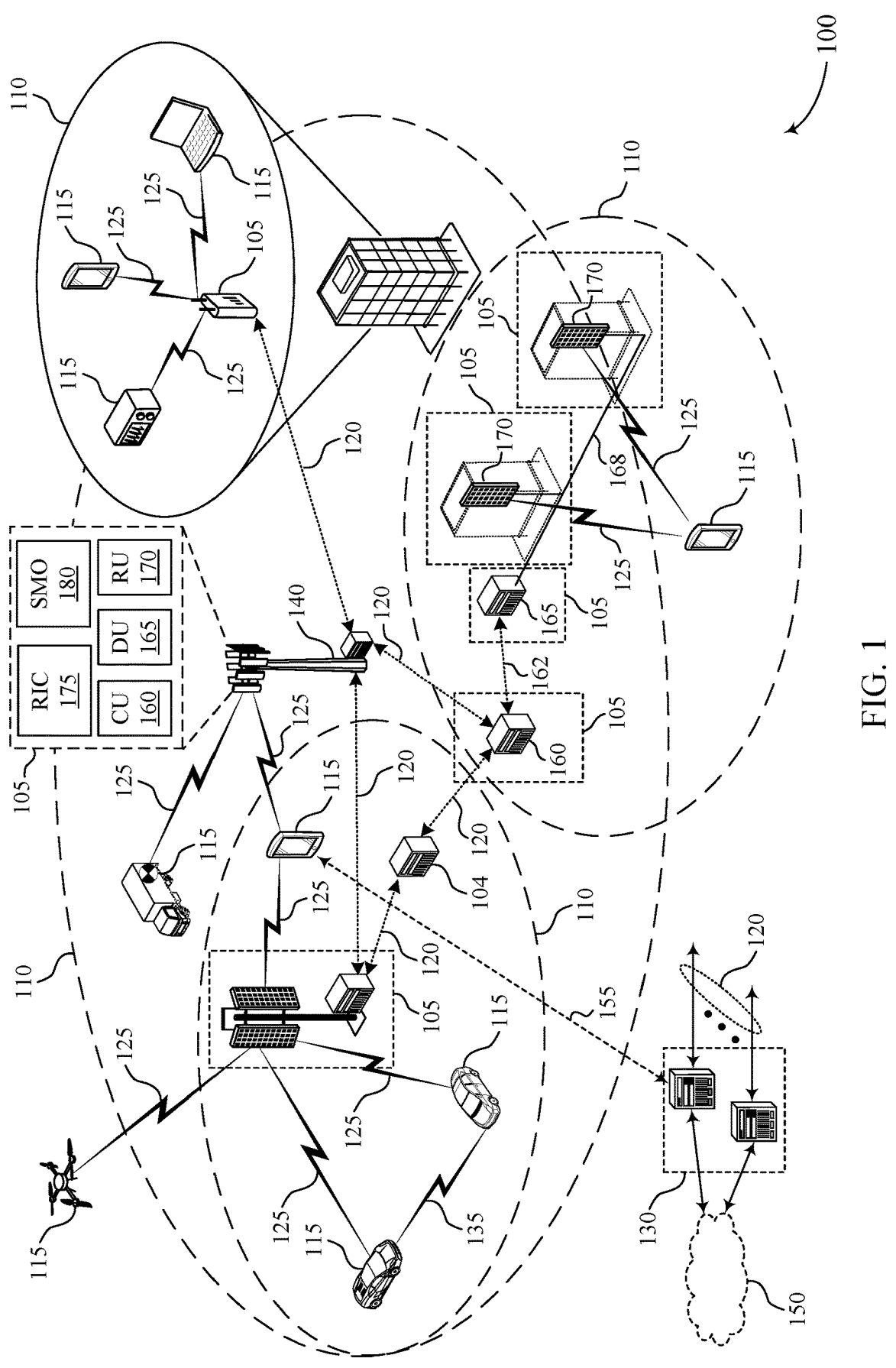
FIG. 1 shows an example of a wireless communications system that supports uplink spatial relation information in subband full duplex (SBFD) in accordance with one or more aspects of the present disclosure.

Some wireless communications systems may implement a subband full duplex (SBFD) communication scheme, where a first set of frequency resources (which may include one or more non-contiguous subbands) may be used for communications in one direction (one of uplink or downlink), and a second set of frequency resources (which may include one or more non-contiguous subbands) may be used for communications in the other direction in a same time resource (e.g., the same slot or symbol). SBFD resources (e.g., slots/symbols) can alternate or be interspersed with dedicated uplink resources and/or downlink resources (e.g., half-duplex (HD) uplink resources and HD downlink resources, respectively). When a user equipment (UE) receives scheduling information for an uplink transmission, the scheduling information may indicate the uplink spatial relation (e.g., uplink beam) to use for the uplink transmission. Due to interference in SBFD resources (e.g., caused by downlink transmissions in the downlink subbands), the best uplink beam for an SBFD resource type (e.g., resources scheduled or assigned for SBFD communications) may be different from the best uplink beam for an HD uplink resource type (e.g., resources scheduled or assigned for HD uplink communications).

A UE may selectively perform an uplink transmission in an SBFD resource if the indicated uplink beam for the uplink transmission is enabled for SBFD resources, or the UE may selectively cancel or drop the uplink transmission in the SBFD resource if the indicated uplink beam for the uplink transmission is restricted for SBFD resources. Similarly, a network entity may selectively monitor for or refrain from monitoring for an uplink transmission from a UE in an SBFD resource based on whether the indicated uplink beam for the uplink transmission is enabled or restricted for SBFD resources. For example, a UE may be configured with two uplink spatial relations (e.g., two uplink beams), one configured for HD uplink resources and one configured for SBFD resources. The UE may communicate uplink transmissions scheduled in SBFD resources using the configured uplink beam for SBFD resources and the UE may communicate uplink transmissions scheduled in HD uplink resources using the configured uplink beam for HD uplink resources.

In one aspect, radio resource control (RRC) signaling may configure two spatial relations, and may indicate that one of the spatial relations is for SBFD resources and the other is for HD uplink resources. In another aspect, RRC signaling may configure a single spatial relation that includes two source reference signal fields, where one of the source reference signal fields indicates the uplink beam for SBFD resources and the other source reference signal field indicates the uplink beam for HD uplink resources. In another aspect, RRC signaling may configure multiple uplink beams, and a medium access control (MAC) control element (MAC-CE) may activate two of the configured uplink beams and associate one of the two with SBFD resources and the other of the two with HD uplink resources. In some examples, the downlink control information (DCI) or configured grant (CG) that schedules a physical uplink shared channel may indicate two sounding reference signal (SRS) resource indicators (SRIs) or two transmission configuration indicator (TCI) states for SBFD resources and for HD uplink resources, where the SRIs or TCI states indicate the uplink beams for the SBFD resources and for the HD uplink resources. In some aspects, a single uplink beam may be configured, and the network may indicate to the UE (e.g., in RRC, MAC-CE, or a scheduling DCI) that the UE may use the uplink beam for both HD uplink resources and SBFD resources. In some aspects, a single uplink beam may be configured and the single beam may be restricted from SBFD resources. In such aspects, the UE may drop or cancel a scheduled transmission in an SBFD resource.

Aspects of the disclosure are initially described in the context of wireless communications systems. Aspects of the disclosure are further illustrated by and described with reference to slot diagrams, resource diagrams, process flows, apparatus diagrams, system diagrams, and flowcharts that relate to uplink spatial relation information in SBFD.

FIG. 1 shows an example of a wireless communications system 100 that supports uplink spatial relation information in SBFD in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support uplink spatial relation information in SBFD as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communication system 100 may implement an SBFD communication scheme. SBFD resources (e.g., slots/symbols) may alternate or be interspersed with dedicated HD uplink resources and/or downlink resources. An SBFD resource may be a resource in which at least one portion (e.g., subband) of a carrier bandwidth is allocated for communications in one direction (e.g., uplink) and at least another portion of the carrier bandwidth is allocated for communications in another direction (e.g., downlink). A dedicated uplink resource refers to a resource in which an entirety of the carrier bandwidth is allocated for uplink communications, and may also be referred to as an HD uplink resource. A dedicated downlink resource refers to a resource in which an entirety of the carrier bandwidth is allocated for downlink communications, and may also be referred to as an HD downlink resource.

When a UE 115 receives scheduling information for an uplink transmission, the scheduling information may indicate the uplink spatial relation (e.g., uplink beam) to use for the uplink transmission. Due to interference in SBFD resources (e.g., caused by downlink transmissions in the downlink subbands), the best uplink beam for an SBFD resource may be different from the best uplink beam for an HD uplink resource.

A UE 115 may selectively perform an uplink transmission in an SBFD resource if the indicated uplink beam for the uplink transmission is enabled for SBFD resources, or the UE 115 may selectively cancel or drop the uplink transmission in the SBFD resource if the indicated uplink beam for the uplink transmission is restricted for SBFD resources. Similarly, a network entity 105 may selectively monitor for or refrain from monitoring for an uplink transmission from a UE in an SBFD resource based on whether the indicated uplink beam for the uplink transmission is enabled or restricted for SBFD resources. For example, a UE 115 may be configured with two uplink spatial relations (e.g., two uplink beams), one configured for HD uplink resources and one configured for SBFD resources. In such cases, the UE 115 may communicate uplink transmissions scheduled in SBFD resources using the configured uplink beam for SBFD resources and the UE 115 may communicate uplink transmissions scheduled in HD uplink resources using the configured uplink beam for HD uplink resources.

In one aspect. RRC signaling may configure two spatial relations, and may indicate that one of the spatial relations is for SBFD resources and the other is for HD uplink resources. In another aspect. RRC signaling may configure a single spatial relation that includes two source reference signal fields, where one of the source reference signal fields indicates the uplink beam for SBFD resources and the other source reference signal field indicates the uplink beam for HD uplink resources. In another aspect. RRC signaling may configure multiple uplink beams, and a MAC-CE may activate two of the configured uplink beams and associate one of the two with SBFD resources and the other of the two with HD uplink resources. In some examples, the DCI or CG that schedules a physical uplink shared channel may indicate two SRIs or two TCI states for SBFD resources and for HD uplink resources, where the SRIs or TCI states indicate the uplink beams for the SBFD resources and for the HD uplink resources. In some aspects, a single uplink beam may be configured, and the network may indicate to the UE 115 (e.g., in RRC, MAC-CE, or a scheduling DCI) that the UE 115 may use the uplink beam for both HD uplink resources and SBFD resources. In some aspects, a single uplink beam may be configured and the single uplink beam may be restricted from SBFD resources. In such aspects, the UE 115 may drop or cancel a scheduled transmission in an SBFD resource, and the network entity 105 may refrain from monitoring for the scheduled transmission.

Additionally or alternatively, the wireless communications system 100 may implement SBFD in sidelink communications between UEs 115 or in other peer-to-peer communications scenarios. In sidelink communications, SBFD sidelink resources may alternate with or be interspersed with HD sidelink resources. HD sidelink resources, from the perspective of a first UE 115, may alternate between HD sidelink transmission resources and HD sidelink reception resources. From the perspective of a UE, a sidelink SBFD resource refers to a resource in which the carrier bandwidth includes at least one subband for transmission and at least one subband for reception. Similarly to uplink transmissions, due to interference in SFBD resources, the best sidelink beam for an SBFD sidelink resource may be different than the best sidelink beam for an HD sidelink transmission resource. A transmitting UE 115 may be configured with or indicated with the sidelink beam to use for a scheduled sidelink transmission. Accordingly, UEs 115 may implement the same principles described herein with respect to access communications with a network entity 105 for sidelink communications with other UEs 115, or any other network devices may implement the principles described herein in other peer-to-peer communications scenarios which implement SBFD communications.

For example, a transmitting UE 115 may selectively perform a sidelink transmission in a sidelink SBFD resource if the indicated sidelink beam for the sidelink transmission is enabled for sidelink SBFD resources, or the UE 115 may selectively cancel or drop the sidelink transmission in the sidelink SBFD resource if the indicated sidelink beam for the sidelink transmission is restricted for sidelink SBFD resources. Similarly, a receiving UE 115 may selectively monitor for or refrain from monitoring for a sidelink transmission from a transmitting UE 115 in a sidelink SBFD resource based on whether the indicated sidelink beam for the sidelink transmission is enabled or restricted for sidelink SBFD resources. For example, a transmitting UE 115 may be configured with two sidelink spatial relations (e.g., two sidelink beams), one configured for HD sidelink resources and one configured for sidelink SBFD resources. In such cases, the UE 115 may communicate sidelink transmissions scheduled in sidelink SBFD resources using the configured sidelink beam for sidelink SBFD resources and the UE 115 may communicate sidelink transmissions scheduled in HD sidelink resources using the configured sidelink beam for HD sidelink resources. In some aspects, a single sidelink beam may be configured for a UE 115, and the single sidelink beam may be enabled for both HD sidelink resources and sidelink SBFD resources. In some aspects, a single sidelink beam may be configured and the single sidelink beam may be restricted from sidelink SBFD resources. In such aspects, the transmitting UE 115 may drop or cancel a scheduled sidelink transmission in a sidelink SBFD resource, and the receiving UE 115 may refrain from monitoring for the scheduled sidelink transmission.

Figure 2:
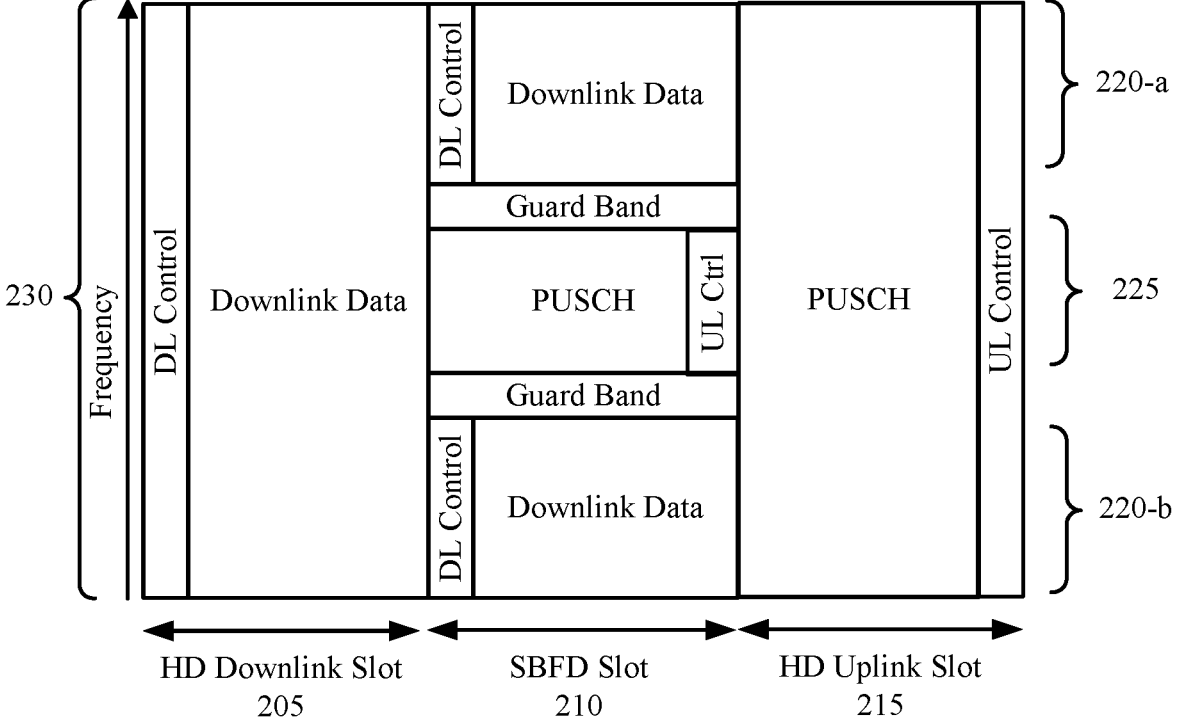
FIG. 2 shows an example of a slot format that supports uplink spatial relation information in SBFD in accordance with one or more aspects of the present disclosure.

FIG. 2 shows an example of a slot format 200 that supports uplink spatial relation information in SBFD in accordance with one or more aspects of the present disclosure. The slot format may be implemented by or may implement aspects of the wireless communications system 100.

The slot format 200 illustrates an example HD downlink slot 205, an SBFD slot 210, and an HD uplink slot 215 for a carrier bandwidth 230. The HD downlink slot 205 includes a downlink control region (e.g., resources for downlink control (e.g., resources for a physical downlink control channel (PDCCH) which may convey a DCI) and a downlink data region (e.g., resources for a physical downlink shared channel (PDSCH)). The HD uplink slot 215 includes an uplink data region (e.g., resources for a physical uplink shared channel (PUSCH)) and an uplink control region (e.g., resources for uplink control (e.g., resources for a physical uplink control channel (PUCCH) which may convey uplink control information (UCI)).

The SBFD slot 210 includes a BWP including a first downlink subband 220-*a* and a second downlink subband 220-*b*. In a 'D+U' slot, as in SBFD slot 210, the carrier bandwidth 230 may be used for both uplink and downlink transmissions. As illustrated in FIG. 2, the SBFD slot 210 includes an uplink BWP including an uplink subband 225. Guard bands may separate the first downlink subband 220-*a* and the second downlink subband 220-*b* from the uplink subband 225. The first downlink subband 220-*a* includes a downlink control region and a downlink data region. The second downlink subband 220-*b* includes a downlink control region and a downlink data region. The uplink subband 225 includes a PUSCH region and an uplink control region.

As described herein, SBFD slots 210 may be interspersed or may alternate with HD downlink slot 205 and HD uplink slots 215. When a UE 115 receives scheduling information for an uplink transmission, such as a PUCCH, a PUSCH, or an SRS, the scheduling information may indicate the uplink spatial relation (e.g., uplink beam) to use for the uplink transmission. Due to interference in SBFD slots 210 (e.g., caused by downlink transmissions in the downlink subbands 220), the best uplink beam for SBFD slots 210 may be different from the best uplink beam for HD uplink slots 215. Accordingly, the network may either enable an uplink beam or restrict an uplink beam for SBFD slots 210. In some aspects, the network may enable a first uplink beam for HD uplink slots 215 and a second uplink beam for SBFD slots. The UE 115 may accordingly use the first uplink beam for uplink transmissions scheduled in the HD uplink slots 215 and the second uplink beam for uplink transmissions scheduled in the SBFD slots. In some aspects, the network may enable a single uplink beam for both HD uplink slots 215 and SBFD slots. In some aspects, the network may enable a single uplink beam for HD uplink slots 215 and may restrict the single uplink beam for SBFD slots 210. In such aspects, the UE 115 may cancel uplink transmissions scheduled in the SBFD slots 210.

FIG. 3 shows an example of a wireless communications system 300 that supports uplink spatial relation information in SBFD in accordance with one or more aspects of the present disclosure. The wireless communications system 300 may implement or may be implemented by aspects of the wireless communications system 100 and/or the slot format 200. For example, the wireless communications system 300 may include a UE 115-*a* and a UE 115-*b*, which may be examples of UEs 115 as described herein. The wireless communications system 300 may include a network entity 105-*a*, which may be an example of a network entity 105 as described herein.

The UE 115-*a* may communicate with the network entity 105-*a* using a communication link 125-*a*, and the UE 115-*b* may communicate with the network entity 105-*a* using a communication link 125-*b*. The communication link 125-*a* may be an example of an NR or LTE link between the UE 115-*a* and the network entity 105-*a*. The communication link 125-*b* may be an example of an NR or LTE link between the UE 115-*b* and the network entity 105-*a*. The communication link 125-*a* and the communication link 125-*b* may include bi-directional links that enable both uplink and downlink communications. For example, the UE 115-*a* may transmit uplink signals 305-*a* (e.g., uplink transmissions), such as uplink control signals or uplink data signals, to the network entity 105-*a* using the communication link 125-*a* and the network entity 105-*a* may transmit downlink signals 310-*a* (e.g., downlink transmissions), such as downlink control signals or downlink data signals, to the UE 115-*a* using the communication link 125-*a*. The UE 115-*b* may transmit uplink signals 305-*b* (e.g., uplink transmissions), such as uplink control signals or uplink data signals, to the network entity 105-*a* using the communication link 125-*b* and the network entity 105-*a* may transmit downlink signals 310-*b* (e.g., downlink transmissions), such as downlink control signals or downlink data signals, to the UE 115-*a* using the communication link 125-*b*.

The wireless communication system 100 may implement an SBFD communication scheme. For example, for the communication link 125-*a* and the communication link 125-*b*, SBFD resources (e.g., slots/symbols) may alternate or be interspersed with dedicated uplink resources and/or downlink resources. Due to interference in SBFD resources the best uplink beam 315 for an SBFD resource may be different from the best uplink beam for an HD uplink resource. For example, in an SBFD resource, downlink signals 310-*a* and downlink signals 310-*b* may cause interference with the uplink signals 305-*a*. For example, the uplink beam 315-*a* may be the best beam for an HD uplink resource and the uplink beam 315-*b* may be the best beam for an SBFD resource.

The network entity 105-a may transmit control signaling 320 (e.g., RRC) that indicates one or more uplink beams. The network entity 105-a may transmit control signaling 325 that schedules an uplink transmission 335 in an SBFD resource. The control signaling 325 indicates an uplink beam (e.g., indicates one of the uplink beam 315-a or the uplink beam 315-b) of the one or more uplink beams for the uplink transmission. The UE 115-a performs the uplink transmission 335 in the SBFD resource or cancels the uplink transmission 335 based on whether the uplink beam indicated in the control signaling 325 is enabled for or restricted for SBFD resources.

For example, the uplink transmission 335 may be a periodic or semi-persistent (SP) SRS transmission. In some aspects, duplex-specific SRS resources/sets may be configured, and SRS transmissions in the opposite duplex mode may be dropped or canceled (e.g., SRS resources/sets may be configured for HD uplink resources, and SRS transmissions scheduled by the control signaling 325 in an SBFD slot that use the SRS resources configured for HD uplink resources may be dropped/canceled). In some aspects, the same SRS resources may be configured (e.g., by the control signaling 320) across different duplex modes with two sets of parameters, and the UE may select one based on the slot type (e.g., SBFD or uplink) of the transmission occasion.

In some examples, periodic or SP SRS transmissions may be scheduled across SBFD resources (e.g., slots/symbols) and HD uplink resources (e.g., slots/symbols). For example, the uplink transmission 335 may be a first occasion of the periodic or SP SRS transmission in an SBFD resource and the uplink transmission 340 may be a second occasion of the periodic or SP SRS transmission in an HD uplink resource. SRS may refer to both SRS for MIMO (e.g., for 'codebook,' 'antennaSwitching,' 'non-codebook,' or 'beamManagement') or SRS for positioning.

In some examples, the control signaling 320 may configure two SRS-SpatialRelationInfo fields, each associated with a duplex mode (e.g., SBFD and HD). For example, the two SRS-SpatialRelationInfo fields may be explicitly associated with the duplex modes by an RRC parameter or may be associated with the duplex modes based on order. In such examples, the UE 115-a may perform the uplink transmission 335 (e.g., periodic or SP SRS in an SBFD resource) using the uplink beam 315-b (e.g., indicated by the SRS-SpatialRelationInfo associated with SBFD resources/SBFD mode), and the UE 115-a may perform the uplink transmission 340 (e.g., periodic or SP SRS in an HD uplink resource) using the uplink beam 315-a (e.g., indicated by the SRS-SpatialRelationInfo associated with HD uplink resources/ HD mode). In some aspects, if a single SRS-SpatialRelationInfo field is configured, the SRS-SpatialRelationInfo field may indicate whether the indicated uplink beam (e.g., the uplink beam 315-a) is enabled for or restricted for SBFD resources. For example, if the uplink beam 315-a is enabled for SBFD resources, the UE 115-a may perform the uplink transmission 335 (e.g., the periodic or SP SRS in an SBFD resource) and the uplink transmission 340 (e.g., the periodic or SP SRS in an HD uplink resource) using the uplink beam 315-a. As another example, if the uplink beam 315-a is restricted for SBFD resources, the UE 115-a may cancel or drop the uplink transmission 335 (e.g., the periodic or SP SRS in an SBFD resource) and may perform the uplink transmission 340 (e.g., the periodic or SP SRS in an HD uplink resource) using the uplink beam 315-a.

In some aspects, a single SRS-SpatialRelationInfo field may be configured for the UE in the control signaling 320, and the SRS SpatialRelationInfo field may include two source reference signals that indicate two different uplink beams for SBFD and HD uplink resources (e.g., the uplink beam 315-a for HD uplink resources and the uplink beam 315-b for SBFD resources). In such examples, the UE 115-a may perform the uplink transmission 335 (e.g., periodic or SP SRS in an SBFD resource) using the uplink beam 315-b (e.g., indicated by the reference signal in the SRS-Spatial-RelationInfo field associated with SBFD resources/SBFD mode), and the UE 115-a may perform the uplink transmission 340 (e.g., periodic or SP SRS in an HD uplink resource) using the uplink beam 315-a (e.g., indicated by the reference signal in the SRS-SpatialRelationInfo field associated with HD uplink resources/HD mode).

In some aspects, the control signaling 320 (e.g., RRC) may configure multiple uplink beams or multiple SRS-SpatialRelationInfo fields that indicate multiple uplink beams, and third control signaling 330 (e.g., a MAC-CE) may activate two uplink beams or SRS-Spatial RelationInfo fields of the configured multiple uplink beams or multiple SRS-SpatialRelationInfo fields. For example, there may be two fields in the MAC-CE common (ResourceID$_{i,0}$, ResourceID$_{i,1}$). The third control signaling 330 may indicate one of the uplink beams (e.g., the uplink beam 315-a) or SRS-SpatialRelationInfo fields is associated with HD uplink resources, and the other one of the uplink beams (e.g., the uplink beam 315-b) or SRS-SpatialRelationInfo fields is associated with SBFD resources. In such examples, the UE 115-a may perform the uplink transmission 335 (e.g., periodic or SP SRS in an SBFD resource) using the uplink beam 315-b activated for SBFD resources, and the UE 115-a may perform the uplink transmission 340 (e.g., periodic or SP SRS in an HD uplink resource) using the uplink beam 315-a activated for HD uplink resources. In some aspects, if a single SRS-SpatialRelationInfo field or a single uplink beam is activated by the third control signaling 330, the UE 115-a may either cancel or perform the uplink transmission 335 based on whether the third control signaling enabled or restricted the single SRS-SpatialRelationInfo field or single uplink beam for SBFD resources.

As another example, the uplink transmission 335 may be a periodic PUCCH or a PUCCH repetition across SBFD resources (e.g., slots/symbols) and HD uplink resources (e.g., slots/symbols).

In some examples, the control signaling 320 may configure two PUCCH-SpatialRelationInfo fields, each associated with a duplex mode (e.g., SBFD and HD). For example, the two PUCCH-SpatialRelationInfo may be explicitly associated with the duplex modes by an RRC parameter or may be associated with the duplex modes based on order. In such examples, the UE 115-a may perform the uplink transmission 335 (e.g., periodic PUCCH or PUCCH repetition in an SBFD resource) using the uplink beam 315-b (e.g., indicated by the PUCCH-SpatialRelationInfo associated with SBFD resources/SBFD mode), and the UE 115-a may perform the uplink transmission 340 (e.g., periodic PUCCH or PUCCH repetition in an HD uplink resource) using the uplink beam 315-a (e.g., indicated by the PUCCH-SpatialRelationInfo associated with HD uplink resources/HD). In some aspects, if a single PUCCH-SpatialRelationInfo field is configured, the PUCCH-SpatialRelationInfo field may indicate whether the indicated uplink beam (e.g., the uplink beam 315-a) is enabled for or restricted for SBFD resources. For example, if the uplink beam 315-a is enabled for SBFD resources, the UE 115-a may perform the uplink transmission 335 (e.g., the periodic PUCCH or PUCCH repetition in an SBFD resource) and the uplink transmission 340 (e.g., periodic PUCCH or PUCCH repetition in an HD uplink resource)

using the uplink beam 315-a. As another example, if the uplink beam 315-a is restricted for SBFD resources, the UE 115-a may cancel or drop the uplink transmission 335 (e.g., the periodic PUCCH or PUCCH repetition in an SBFD resource) and may perform the uplink transmission 340 (e.g., periodic PUCCH or PUCCH repetition in an HD uplink resource) using the uplink beam 315-a.

In some aspects, a single PUCCH-SpatialRelationInfo field may be configured for the UE in the control signaling 320, and the PUCCH-SpatialRelationInfo field may include two source reference signals that indicate two different uplink beams for SBFD and HD uplink resources (e.g., the uplink beam 315-a for HD uplink resources and the uplink beam 315-b for SBFD resources). In such examples, the UE 115-a may perform the uplink transmission 335 (e.g., periodic PUCCH or PUCCH repetition in an SBFD resource) using the uplink beam 315-b (e.g., indicated by the reference signal in the PUCCH-SpatialRelationInfo field associated with SBFD resources/SBFD mode), and the UE 115-a may perform the uplink transmission 340 (e.g., periodic PUCCH or PUCCH repetition in an HD uplink resource) using the uplink beam 315-a (e.g., indicated by the reference signal in the PUCCH-SpatialRelationInfo field associated with HD uplink resources/HD).

aspects, the dropped/canceled PUCCH repetitions may not be counted. In some aspects, different power control parameters may be configured for PUCCH transmissions across the different duplex modes (e.g., for SBFD resources and HD uplink resources). For example, as shown in Table 2, two PUCCH power control set IDs may be configured activated in the third control signaling 330 (e.g., MAC-CE) for SBFD resources and HDD uplink resources).

TABLE 1

| | | Periodic PUCCH MAC-CE Design | | |
|---|---|---|---|---|
| R | | Serving Cell ID | BWP ID | Oct 1 |
| C | | PUCCH Resource ID | | Oct 2 |
| R | R | Spatial Relation Info $ID_0$ | | Oct 3 |
| R | R | Spatial Relation Info $ID_1$ | | Oct 4 |
| | | . . . | | |
| R | | PUCCH Resource ID | | Oct 2N-3 |
| R | R | Spatial Relation Info $ID_0$ | | Oct 2N-2 |
| R | R | Spatial Relation Info $ID_1$ | | Oct 2N-1 |

TABLE 2

| | | Periodic PUCCH MAC-CE Power Control Design | | |
|---|---|---|---|---|
| R | | Serving Cell ID | BWP ID | Oct 1 |
| C | | PUCCH Resource ID | | Oct 2 |
| R | R | PUCCH Power Control Set $ID_0$ | PUCCH Power Control Set $ID_1$ | Oct 3 |
| | | . . . | | |
| C | | PUCCH Resource ID | | Oct 2N-2 |
| R | R | PUCCH Power Control Set $ID_0$ | PUCCH Power Control Set $ID_1$ | Oct 2N-1 |

In some aspects, the control signaling 320 (e.g., RRC) may configure multiple uplink beams or multiple PUCCH-SpatialRelationInfo fields that indicate multiple uplink beams, and third control signaling 330 (e.g., a MAC-CE) may activate two uplink beams or PUCCH-SpatialRelation-Info fields of the configured multiple uplink beams or multiple PUCCH-SpatialRelationInfo fields. For example, as shown in Table 1 below, the Spatial Relation Info IDs may be indicated in Oct 3 and Oct 4 of a MAC-CE that activates a periodic PUCCH. The third control signaling 330 may indicate one of the uplink beams (e.g., the uplink beam 315-a) or PUCCH-SpatialRelationInfo fields is associated with HD uplink resources, and the other one of the uplink beams (e.g., the uplink beam 315-b) or PUCCH-SpatialRelationInfo fields is associated with SBFD resources. In such examples, the UE 115-a may perform the uplink transmission 335 (e.g., periodic PUCCH or PUCCH repetition in an SBFD resource) using the uplink beam 315-b activated for SBFD resources, and the UE 115-a may perform the uplink transmission 340 (e.g., periodic PUCCH or PUCCH repetition in an HD uplink resource) using the uplink beam 315-a activated for HD uplink resources. In some aspects, if a single PUCCH-SpatialRelationInfo field or a single uplink beam is activated by the third control signaling 330, the UE 115-a may either cancel or perform the uplink transmission 335 based on whether the third control signaling enabled or restricted the single PUCCH-SpatialRelationInfo field or single uplink beam for SBFD resources. If the single PUCCH-SpatialRelationInfo field or single uplink beam is restricted for SBFD resources, in some aspects, the dropped/canceled PUCCH repetitions may be counted. In some As another example, the uplink transmission 335 may be a PUSCH repetition. For PUSCH repetitions across SBFD resources (e.g., slots/symbols) and HD uplink resources (e.g., slots/symbols), the control signaling 325 may be an activating or scheduling DCI. For example, the uplink transmission 335 and the uplink transmission 340 may be PUSCH repetitions in the same slot (e.g., uplink symbol and SBFD symbol in the same slot) or in different slots.

The activating or scheduling DCI may include two SRIs, each mapping to one of SBFD resources or HD uplink resources. Accordingly, the UE 115-a may perform the uplink transmission 335 (e.g., PUSCH repetition in an SBFD resource) using the uplink beam 315-b indicated by the SRI mapped to the SBFD resources, and the UE 115-a may perform the uplink transmission 340 (e.g., PUSCH repetition in an HD uplink resource) using the uplink beam 315-a indicated by the SRI mapped to the HD uplink resources. Similarly, for a CG PUSCH Type 1, the RRC configuration may provide up to two SRIs. Additionally, the UE 115-a may be configured or indicated with two transmit precoding matrix indicators (TPMIs) and two ranks for performing PUSCH repetitions in SBFD resources and HD uplink resources. In some aspects, the SRIs may be either two separate bitfields in the DCI or the same bitfield jointly encoded.

In some aspects, if the UE 115-a is configured with a single SRI (e.g., in the control signaling 320 or the control signaling 325), and the corresponding spatial relation info is restricted for SBFD resources, the UE 115-a may drop or cancel the PUSCH transmission scheduled in an SBFD resource. In some aspects, dropped or canceled PUSCH repetitions may be counted (e.g., for incrementing HARQ process ID). In some aspects, dropped or canceled PUSCH repetitions may not be counted.

In some aspects, the activating or scheduling DCI may include two unified TCI states (e.g., instead of SRIs), one per duplex mode. For example, a single TCI codepoint may be mapped to two TCI states.

In some aspects, duplex specific CGs may be configured, and CG transmission occasions in the opposite duplex mode (HD or SBFD) may be dropped or canceled as each CG is configured with the proper SRI or uplink beam (e.g., the SRI mapped to the SRS resource set associated with the same duplex mode). In some aspects, the same CG may be scheduled across different duplex modes (e.g., across SBFD resources and HD uplink resources) and two sets of uplink parameters may be configured, and the UE 115-a may select the appropriate uplink parameters based on the transmission occasion type (SBFD or uplink). For example, the uplink transmission 335 and the uplink transmission 340 may be CG PUSCH occasions in the same slot (e.g., uplink symbol and SBFD symbol in the same slot) or in different slots.

For example, for an SBFD aware UE, the UE 115-a may be configured with two SRIs (mapped to two SRS resource sets, one per each duplex mode). The UE 115-a may also be configured or indicated with two TPMIs and two ranks. Accordingly, the UE 115-a may perform the uplink transmission 335 (e.g., CG PUSCH in an SBFD resource) using the uplink beam 315-b indicated by the SRI mapped to the SBFD resources, and the UE 115-a may perform the uplink transmission 340 (e.g., CG PUSCH in an HD uplink resource) using the uplink beam 315-a indicated by the SRI mapped to the HD uplink resources. In some examples, if the UE 115-a is configured with a single SRI (e.g., in the control signaling 320 or the control signaling 325), and the corresponding spatial relation info is restricted for SBFD resources, the UE 115-a may drop or cancel the CG PUSCH transmission.

In some aspects, a single DCI (e.g., the control signaling 325) may schedule multiple PUSCHs (e.g., the uplink transmission 335 and the uplink transmission 340) over consecutive slots. The consecutive slots may include SBFD and uplink slots. Each PUSCH scheduled by the single DCI may have a respective start and length indicator (SLIV) and may share the same modulation and coding scheme (MCS) and frequency domain resource allocation (FDRA). In some aspects, separate MCSs and FDRAs may be configured for SBFD and uplink slots. Additionally, or alternatively, a single CG may schedule consecutive of appended PUSCHs.

For a single DCI or a single CG that schedules PUSCHs in SBFD and uplink slots, the activating or scheduling DCI may have two TCI SRIs (or two TCI states), one for each duplex type. For example, the UE 115-a may perform the uplink transmission 335 (e.g., the PUSCH scheduled by the DCI/CG in an SBFD resource) using the uplink beam 315-b indicated by the SRI or TCI state mapped to the SBFD resources, and the UE 115-a may perform the uplink transmission 340 (e.g., the PUSCH scheduled by the DCI/CG in an HD uplink resource) using the uplink beam 315-a indicated by the SRI or TCI state mapped to the HD uplink resources. In some aspects, if the activating or scheduling DCI indicates a single SRI or TCI state, and the SRI or TCI state is restricted for SBFD resources, the transport block may be dropped or skipped, and the HARQ process ID may not be incremented.

Figure 4:
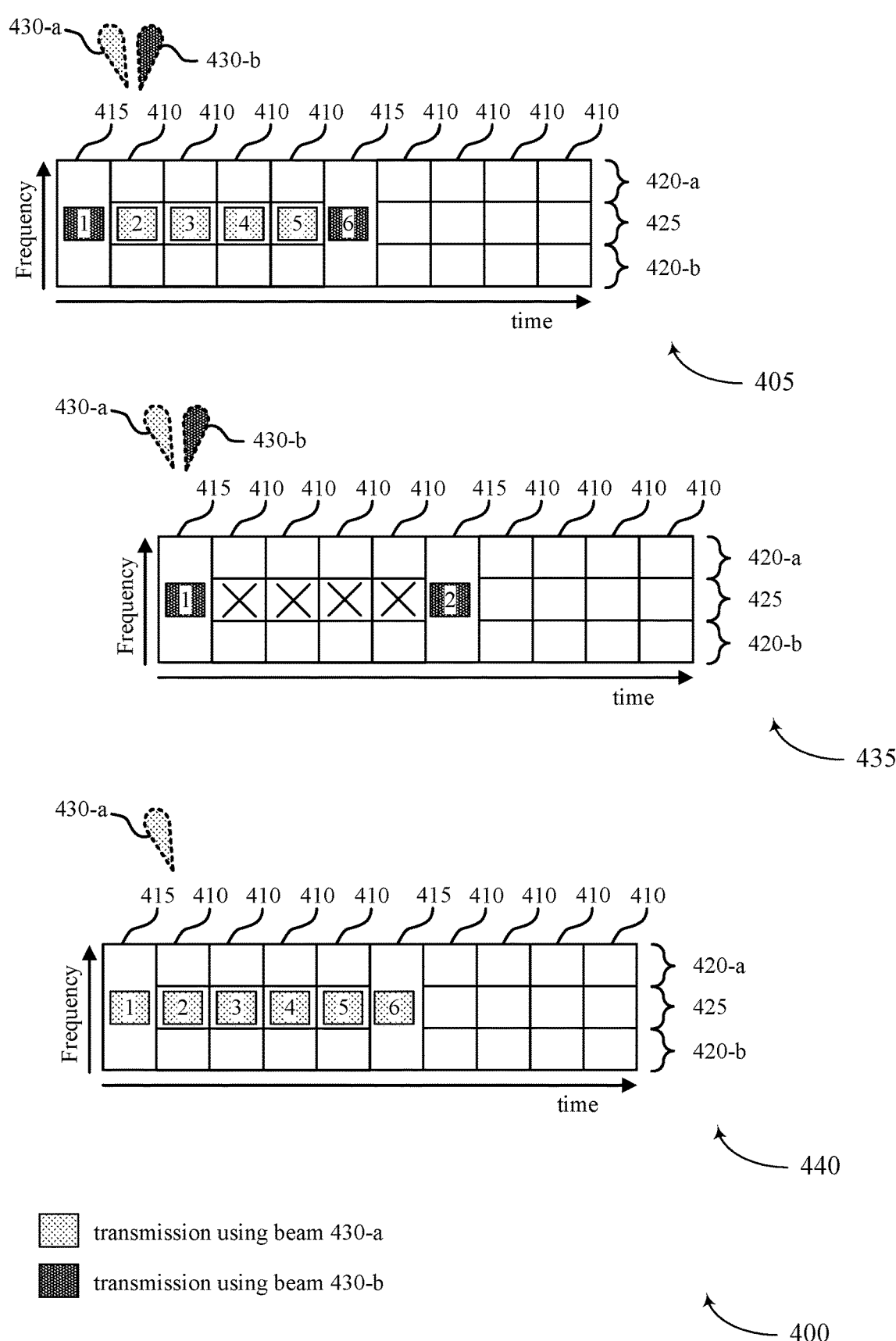
FIG. 4 shows an example of a resource diagram that supports uplink spatial relation information in SBFD in accordance with one or more aspects of the present disclosure.

FIG. 4 shows an example of resource diagrams 400 that support uplink spatial relation information in SBFD in accordance with one or more aspects of the present disclosure. The resource diagrams 400 may implement or may be implemented by aspects of wireless communications system 100 or the wireless communications system 300.

The first resource diagram 405 shows an example where a UE 115 is configured with or indicated with two uplink beams. A first uplink beam 430-a is configured or indicated for uplink slots 415 (e.g., for HD), and a second uplink beam 430-b is configured or indicated for SBFD resources. SBFD slots 410 may include a first downlink subband 420-a, a second downlink subband 420-b, and an uplink subband 425 positioned between the first downlink subband 420-a and the second downlink subband 420-b in the frequency domain. Uplink transmissions (e.g., SRSs, PUCCHs, or PUSCHs) may be scheduled in consecutive uplink slots 415 and SBFD slots 410. For example, a first uplink transmission may be scheduled in the first uplink slot 415, a second uplink transmission may be scheduled in the first SBFD slot 410, a third uplink transmission may be scheduled in the second SBFD slot 410, a fourth uplink transmission may be scheduled in the third SBFD slot 410, a fifth uplink transmission may be scheduled in the fourth SBFD slot 410, and a sixth uplink transmission may be scheduled in the second uplink slot 415. The UE 115 may perform the first and sixth uplink transmissions using the uplink beam 430-a configured or indicated for HD uplink resources, and the UE 115 may perform the second, third, fourth, and fifth uplink transmissions using the second uplink beam 430-b configured or indicated for SBFD resources.

The second resource diagram 435 shows an example where a UE 115 is configured with or indicated with a single uplink beam 430-a that is restricted for SBFD resources. For example, two TCI states corresponding to the uplink beam 430-a and the uplink beam 430-b may be configured, but the TCI state corresponding to the uplink beam 430-b may not be activated. The TCI state corresponding to the uplink beam 430-a may be restricted for SBFD resources. Accordingly, the UE 115 may drop or cancel uplink transmissions scheduled in SBFD slots 410. The UE 115 may perform the uplink transmissions scheduled in uplink slots 415 using the uplink beam 430-a.

The third resource diagram 440 shows an example where a UE 115 is configured with or indicated with a single uplink beam 430-a that is enabled for both HD uplink resources and SBFD resources. For example, a first uplink transmission may be scheduled in the first uplink slot 415, a second uplink transmission may be scheduled in the first SBFD slot 410, a third uplink transmission may be scheduled in the second SBFD slot 410, a fourth uplink transmission may be scheduled in the third SBFD slot 410, a fifth uplink transmission may be scheduled in the fourth SBFD slot 410, and a sixth uplink transmission may be scheduled in the second uplink slot 415. The UE 115 may perform the first, second, third, fourth, fifth, and sixth uplink transmissions using the uplink beam 430-a.

FIG. 5 shows an example of a process flow 500 that supports uplink spatial relation information in SBFD in accordance with one or more aspects of the present disclosure. The process flow 500 may implement or be implemented by aspects of wireless communications system 100 or the wireless communications system 300. For example, the process flow 500 may include a UE 115-c, which may be an example of a UE 115 as described herein. The process flow 500 may also include a network entity 105-b, which may be an example of a network entity 105 as described herein. In the following description of the process flow 500, the operations between the network entity 105-b and the UE 115-c may be transmitted in a different order than the example order shown, or the operations performed by the network entity 105-b and the UE 115-c may be performed in different orders or at different times. Some operations may also be omitted from the process flow 500, and other operations may be added to the process flow 500.

At 505, the network entity 105-b may transmit, to the UE 115-c, first control signaling that indicates one or more uplink beams.

At 510, the network entity 105-b may transmit, to the UE 115-c, second control signaling that schedules an uplink transmission in an SBFD resource. The second control signaling may indicate an uplink beam of the one or more uplink beams for the uplink transmission.

In some examples, at 515, the UE 115-c may selectively perform the uplink transmission using the uplink beam in the SBFD resource based on the uplink beam being enabled for an SBFD resource type. In such examples, at 520, the network entity 105-b may selectively monitor for the uplink transmission using the uplink beam in the SBFD resource based on the uplink beam being enabled for an SBFD resource type. In some aspects, the network entity 105-b may transmit, to the UE 115-c, third control signaling indicating the uplink beam is enabled for the SBFD resource type and that a second beam of the one or more uplink beams is enabled for an uplink resource type (e.g., HD uplink resources).

In some examples, at 525, the UE 115-c may selectively cancel the uplink transmission in the SBFD resource based on the uplink beam being restricted for the SBFD resource type. In such examples, at 530, the network entity 105-b may refrain from monitoring for the uplink transmission in the SBFD resource based on the uplink beam being restricted for the SBFD resource type.

In some examples, the first control signaling at 505 may include an indication that the uplink beam is enabled for the SBFD resource type and that a second uplink beam is enabled for the uplink resource type. In some examples, the first control signaling may include an indication of a first spatial relation (e.g., SRS-SpatialRelationInfo field in RRC or PUCCH-SpatialRelationInfo field in RRC) associated with the SBFD resource type and a second spatial relation associated with the uplink resource type, and the first spatial relation is indicative of the uplink beam and the second spatial relation is indicative of the second uplink beam. In some examples, the first control signaling may include an indication of a spatial relation associated with both the SBFD resource type and the uplink resource type, the spatial relation includes a first reference signal field associated with the SBFD resource type and a second reference signal field associated with the uplink resource type, and the first reference signal field is indicative of the uplink beam and the second reference signal field is indicative of the second uplink beam. In some aspects, the network entity 105-b may transmit, to the UE 115-c, third control signaling scheduling a second uplink transmission in an uplink resource, and the UE 115-c may perform the uplink transmission using the uplink beam in the SBFD resource and the second uplink transmission using the second uplink beam in the uplink resource.

In some examples, the second control signaling may include an indication of a first SRI or a first TCI state associated with the SBFD resource type and a second SRI or a second TCI state associated with an uplink resource type. The first SRI or the first TCI state may be indicative of the uplink beam and the second SRI or the second TCI state may be indicative of a second uplink beam of the one or more uplink beams, and the uplink transmission may be an uplink shared channel transmission. In some examples, the UE 115-c may receive, with the second control signaling, scheduling information for a set of uplink shared channel repetitions that include a first repetition in the SBFD resource and a second repetition in an uplink resource, where the uplink shared channel transmission is the first repetition. In such examples, the UE 115-c may perform the first repetition using the uplink beam in the SBFD resource and the second repetition using the second uplink beam in the uplink resource. In some examples, the UE 115-c may receive, with the second control signaling, a CG that schedules the uplink shared channel transmission in the SBFD resource and a second uplink shared channel transmission in an uplink resource, where the uplink shared channel transmission is performed using the uplink beam in the SBFD resource, and where the second uplink shared channel transmission is performed using the second uplink beam in the uplink resource. In some examples, the UE 115-c may receive, with the second control signaling, scheduling information for a second uplink shared channel transmission in an uplink resource, where the second control signaling is a single DCI. In such examples, the UE 115-c may perform the uplink shared channel transmission using the uplink beam in the SBFD resource and the second uplink shared channel transmission using the second uplink beam in the uplink resource.

In some examples, at 515, the UE 115-c may perform the uplink transmission using the uplink beam in the SBFD resource, where the one or more uplink beams includes only the uplink beam, and where the uplink beam is enabled for both the SBFD resource type and an uplink resource type.

In some examples, at 515, the UE 115-c may perform the uplink transmission using the uplink beam in the SBFD resource, where the uplink transmission is one of an SRS or an uplink control channel transmission.

In some examples, at 525, the UE 115-c may cancel the uplink transmission in the SBFD resource, where the one or more uplink beams includes only the uplink beam, and where the uplink beam is enabled for an uplink resource type and is restricted for the SBFD resource type.

Figure 6:
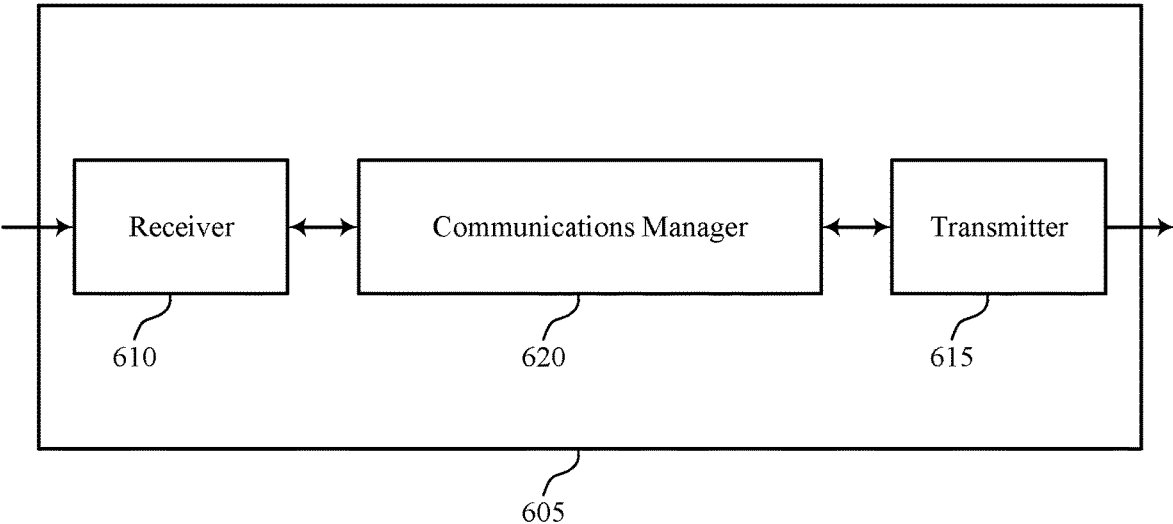
FIGS. 6 and 7 show block diagrams of devices that support uplink spatial relation information in SBFD in accordance with one or more aspects of the present disclosure.

FIG. 6 shows a block diagram 600 of a device 605 that supports uplink spatial relation information in SBFD in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink spatial relation information in SBFD). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink spatial relation information in SBFD). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of uplink spatial relation information in SBFD as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 is capable of, configured to, or operable to support a means for receiving first control signaling that indicates one or more uplink beams. The communications manager 620 is capable of, configured to, or operable to support a means for receiving second control signaling that schedules an uplink transmission in an SBFD resource, where the second control signaling indicates an uplink beam of the one or more uplink beams for the uplink transmission. The communications manager 620 is capable of, configured to, or operable to support a means for selectively performing the uplink transmission using the uplink beam in the SBFD resource or cancelling the uplink transmission in the SBFD resource, where selectively performing or cancelling the uplink transmission is based on whether the uplink beam is enabled or restricted for an SBFD resource type.

By including or configuring the communications manager 620 in accordance with examples as described herein, the device 605 (e.g., a processor controlling or otherwise coupled with the receiver 610, the transmitter 615, the communications manager 620, or a combination thereof) may support techniques more efficient utilization of communication resources.

Figure 7:
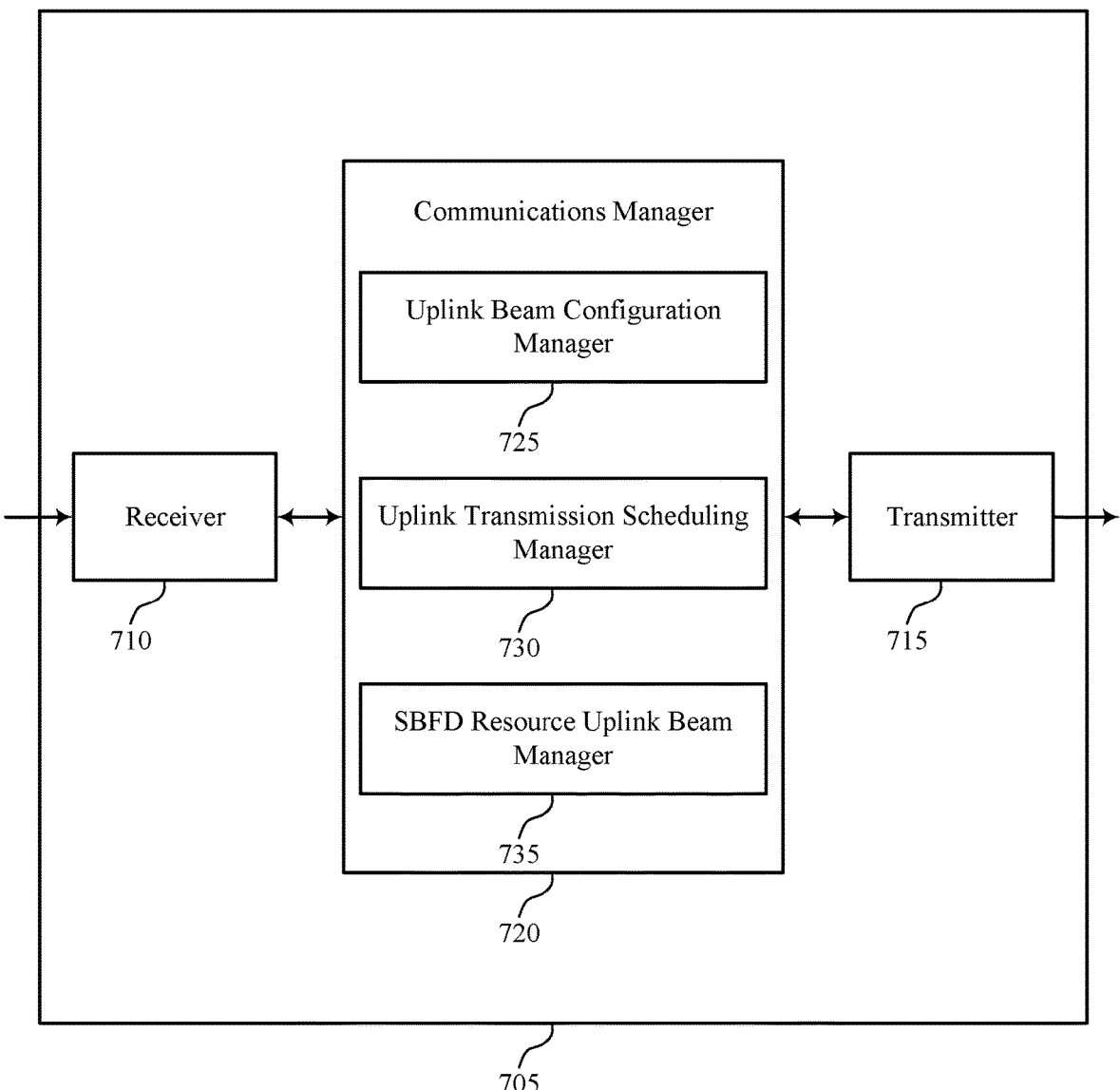

FIG. 7 shows a block diagram 700 of a device 705 that supports uplink spatial relation information in SBFD in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink spatial relation information in SBFD). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink spatial relation information in SBFD). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of uplink spatial relation information in SBFD as described herein. For example, the communications manager 720 may include an uplink beam configuration manager 725, an uplink transmission scheduling manager 730, an SBFD resource uplink beam manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The uplink beam configuration manager 725 is capable of, configured to, or operable to support a means for receiving first control signaling that indicates one or more uplink beams. The uplink transmission scheduling manager 730 is capable of, configured to, or operable to support a means for receiving second control signaling that schedules an uplink transmission in an SBFD resource, where the second control signaling indicates an uplink beam of the one or more uplink beams for the uplink transmission. The SBFD resource uplink beam manager 735 is capable of, configured to, or operable to support a means for selectively performing the uplink transmission using the uplink beam in the SBFD resource or cancelling the uplink transmission in the SBFD resource, where selectively performing or cancelling the uplink transmission is based on whether the uplink beam is enabled or restricted for an SBFD resource type.

Figure 8:
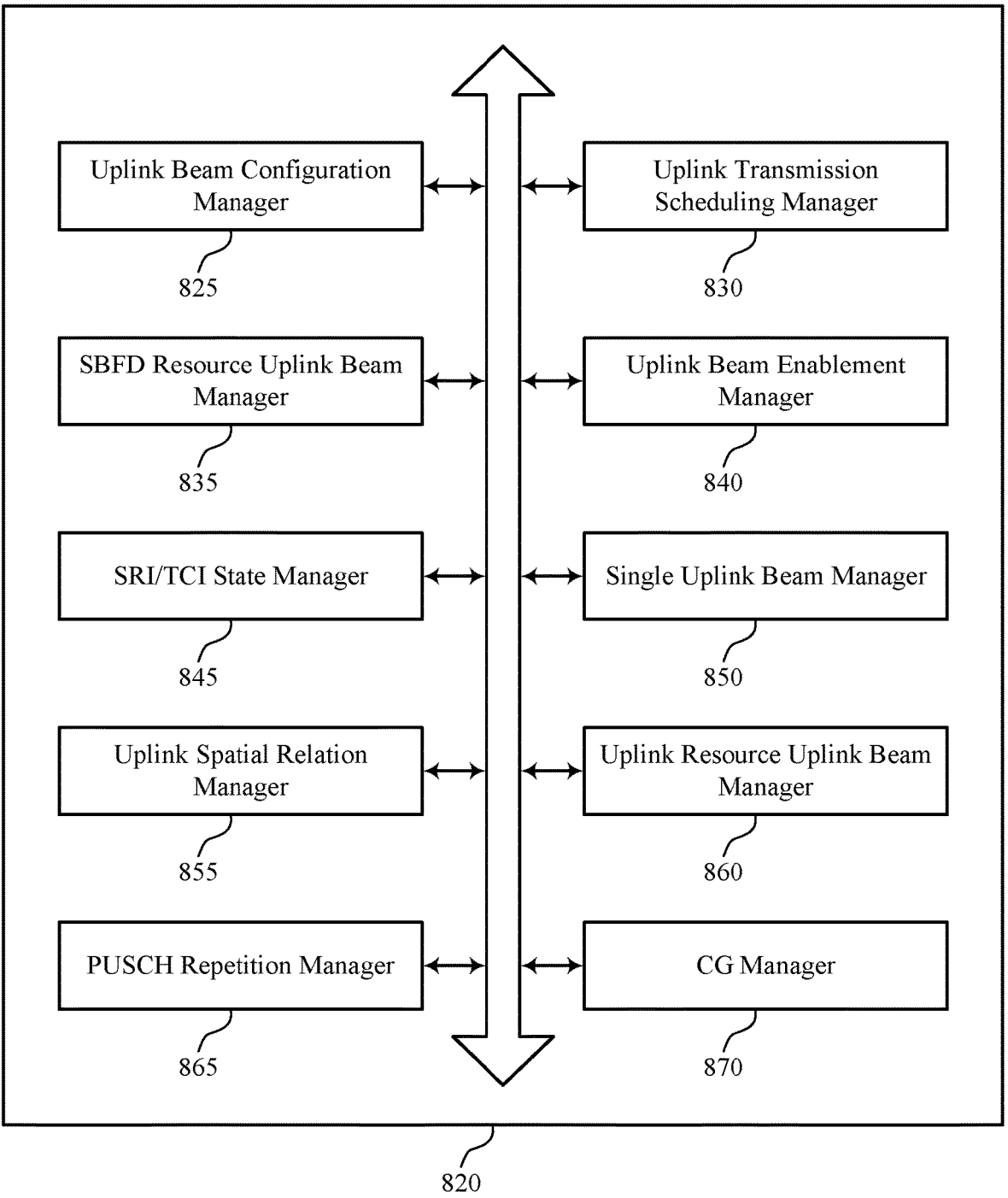
FIG. 8 shows a block diagram of a communications manager that supports uplink spatial relation information in SBFD in accordance with one or more aspects of the present disclosure.

FIG. 8 shows a block diagram 800 of a communications manager 820 that supports uplink spatial relation information in SBFD in accordance with one or more aspects of the present disclosure. The communications manager 820 may be an example of aspects of a communications manager 620, a communications manager 720, or both, as described herein. The communications manager 820, or various components thereof, may be an example of means for performing various aspects of uplink spatial relation information in SBFD as described herein. For example, the communications manager 820 may include an uplink beam configuration manager 825, an uplink transmission scheduling manager 830, an SBFD resource uplink beam manager 835, an uplink beam enablement manager 840, an SRI/TCI state manager 845, a single uplink beam manager 850, an uplink spatial relation manager 855, an uplink resource uplink beam manager 860, an PUSCH repetition manager 865, a CG manager 870, or any combination thereof. Each of these components may communicate, directly or indirectly, with one another (e.g., via one or more buses).

The communications manager 820 may support wireless communications at a UE in accordance with examples as disclosed herein. The uplink beam configuration manager 825 is capable of, configured to, or operable to support a means for receiving first control signaling that indicates one or more uplink beams. The uplink transmission scheduling manager 830 is capable of, configured to, or operable to support a means for receiving second control signaling that schedules an uplink transmission in an SBFD resource, where the second control signaling indicates an uplink beam of the one or more uplink beams for the uplink transmission. The SBFD resource uplink beam manager 835 is capable of, configured to, or operable to support a means for selectively performing the uplink transmission using the uplink beam in the SBFD resource or cancelling the uplink transmission in the SBFD resource, where selectively performing or cancelling the uplink transmission is based on whether the uplink beam is enabled or restricted for an SBFD resource type.

In some examples, to support receiving the first control signaling, the uplink beam configuration manager 825 is capable of, configured to, or operable to support a means for receiving an indication that the one or more uplink beams include the uplink beam enabled for the SBFD resource type and a second uplink beam enabled for an uplink resource type.

In some examples, to support receiving the indication that the one or more uplink beams include the uplink beam enabled for the SBFD resource type and the second uplink beam enabled for the uplink resource type, the uplink spatial relation manager 855 is capable of, configured to, or operable to support a means for receiving an indication of a first spatial relation associated with the SBFD resource type and a second spatial relation associated with the uplink resource type, where the first spatial relation is indicative of the uplink beam and the second spatial relation is indicative of the second uplink beam.

In some examples, to support receiving the indication that the one or more uplink beams include the uplink beam enabled for the SBFD resource type and the second uplink beam enabled for the uplink resource type, the uplink spatial relation manager 855 is capable of, configured to, or operable to support a means for receiving an indication of a spatial relation associated with both the SBFD resource type and the uplink resource type, where the spatial relation includes a first reference signal field associated with the SBFD resource type and a second reference signal field associated with the uplink resource type, where the first reference signal field is indicative of the uplink beam and the second reference signal field is indicative of the second uplink beam.

In some examples, the uplink transmission scheduling manager 830 is capable of, configured to, or operable to support a means for receiving third control signaling scheduling a second uplink transmission in an uplink resource. In some examples, the SBFD resource uplink beam manager 835 is capable of, configured to, or operable to support a means for performing the uplink transmission using the uplink beam in the SBFD resource. In some examples, the uplink resource uplink beam manager 860 is capable of, configured to, or operable to support a means for performing the second uplink transmission using the second uplink beam in the uplink resource.

In some examples, the uplink beam enablement manager 840 is capable of, configured to, or operable to support a means for receiving third control signaling indicating the uplink beam is enabled for the SBFD resource type and that a second beam of the one or more uplink beams is enabled for an uplink resource type.

In some examples, to support receiving the second control signaling, the SRI/TCI state manager 845 is capable of, configured to, or operable to support a means for receiving an indication of a first SRI or a first TCI state associated with the SBFD resource type and a second SRI or a second TCI state associated with an uplink resource type, where the first SRI or the first TCI state is indicative of the uplink beam and the second SRI or the second TCI state is indicative of a second uplink beam of the one or more uplink beams, and where the uplink transmission is an uplink shared channel transmission.

In some examples, the PUSCH repetition manager 865 is capable of, configured to, or operable to support a means for receiving, with the second control signaling, scheduling information for a set of uplink shared channel repetitions including a first repetition in the SBFD resource and a second repetition in an uplink resource, where the uplink shared channel transmission is the first repetition. In some examples, the SBFD resource uplink beam manager 835 is capable of, configured to, or operable to support a means for performing the first repetition using the uplink beam in the SBFD resource. In some examples, the uplink resource uplink beam manager 860 is capable of, configured to, or operable to support a means for performing the second repetition using the second uplink beam in the uplink resource.

In some examples, to support receiving the second control signaling, the CG manager 870 is capable of, configured to, or operable to support a means for receiving a CG that schedules the uplink shared channel transmission in the SBFD resource and a second uplink shared channel transmission in an uplink resource, where the uplink shared channel transmission is performed using the uplink beam in the SBFD resource, and where the second uplink shared channel transmission is performed using the second uplink beam in the uplink resource.

In some examples, the uplink transmission scheduling manager 830 is capable of, configured to, or operable to support a means for receiving, with the second control signaling, scheduling information for a second uplink shared channel transmission in an uplink resource, where the second control signaling is a single DCI. In some examples, the SBFD resource uplink beam manager 835 is capable of, configured to, or operable to support a means for performing the uplink shared channel transmission using the uplink beam in the SBFD resource. In some examples, the uplink resource uplink beam manager 860 is capable of, configured to, or operable to support a means for performing the second uplink shared channel transmission using the second uplink beam in the uplink resource.

In some examples, the single uplink beam manager 850 is capable of, configured to, or operable to support a means for performing the uplink transmission using the uplink beam in the SBFD resource, where the one or more uplink beams includes only the uplink beam, and where the uplink beam is enabled for both the SBFD resource type and an uplink resource type.

In some examples, the SBFD resource uplink beam manager 835 is capable of, configured to, or operable to support a means for cancelling the uplink transmission in the SBFD resource, where the one or more uplink beams includes only the uplink beam, and where the uplink beam is enabled for an uplink resource type and is restricted for the SBFD resource type.

In some examples, the SBFD resource uplink beam manager 835 is capable of, configured to, or operable to support a means for performing the uplink transmission using the uplink beam in the SBFD resource, where the uplink transmission is one of an SRS or an uplink control channel transmission.

Figure 9:
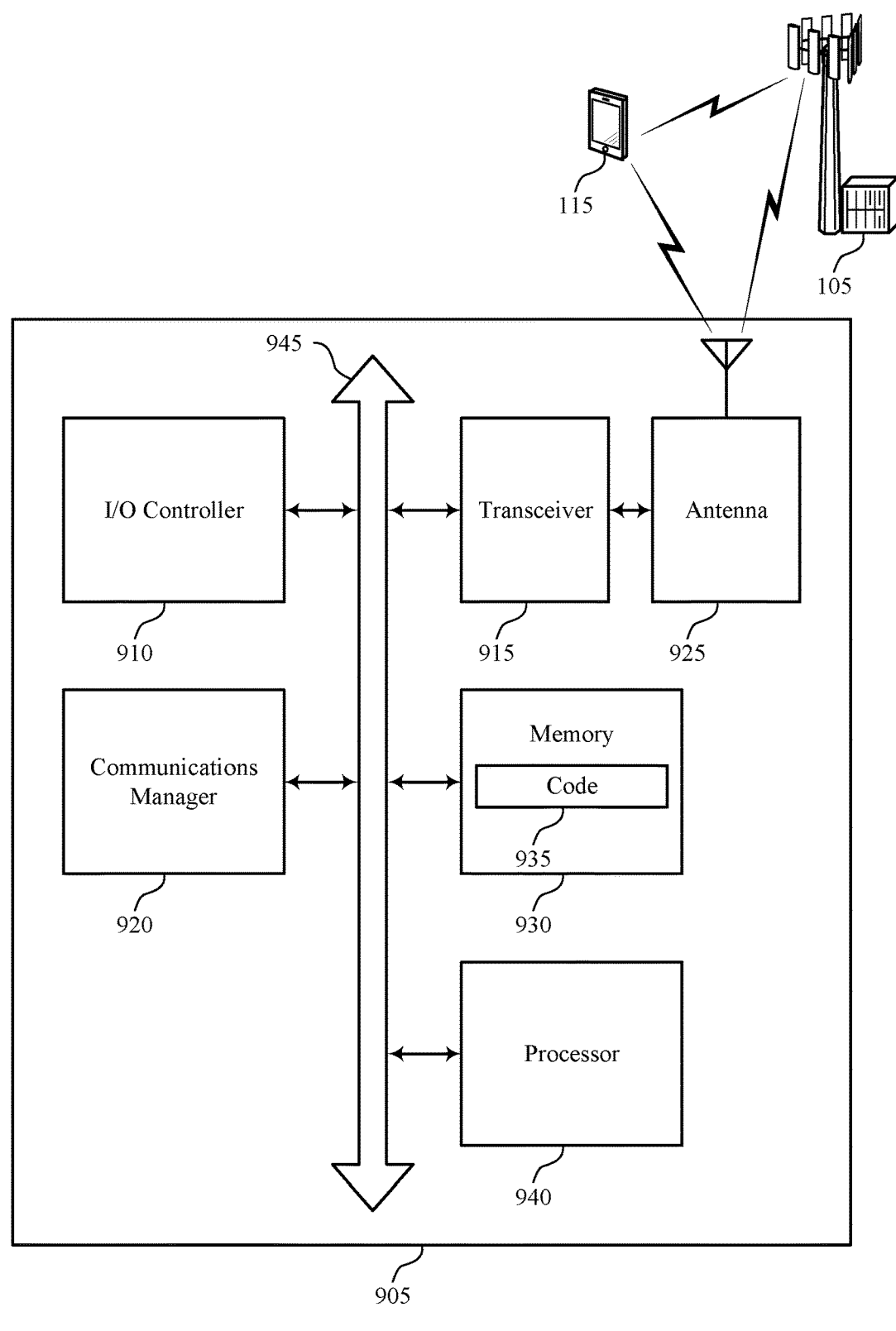
FIG. 9 shows a diagram of a system including a device that supports uplink spatial relation information in SBFD in accordance with one or more aspects of the present disclosure.

FIG. 9 shows a diagram of a system 900 including a device 905 that supports uplink spatial relation information in SBFD in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink spatial relation information in SBFD). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 is capable of, configured to, or operable to support a means for receiving first control signaling that indicates one or more uplink beams. The communications manager 920 is capable of, configured to, or operable to support a means for receiving second control signaling that schedules an uplink transmission in an SBFD resource, where the second control signaling indicates an uplink beam of the one or more uplink beams for the uplink transmission. The communications manager 920 is capable of, configured to, or operable to support a means for selectively performing the uplink transmission using the uplink beam in the SBFD resource or cancelling the uplink transmission in the SBFD resource, where selectively performing or cancelling the uplink transmission is based on whether the uplink beam is enabled or restricted for an SBFD resource type.

By including or configuring the communications manager 920 in accordance with examples as described herein, the device 905 may support techniques for improved communication reliability, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of uplink spatial relation information in SBFD as described herein, or the processor 940 and the memory 930 may be otherwise configured to perform or support such operations.

Figure 10:
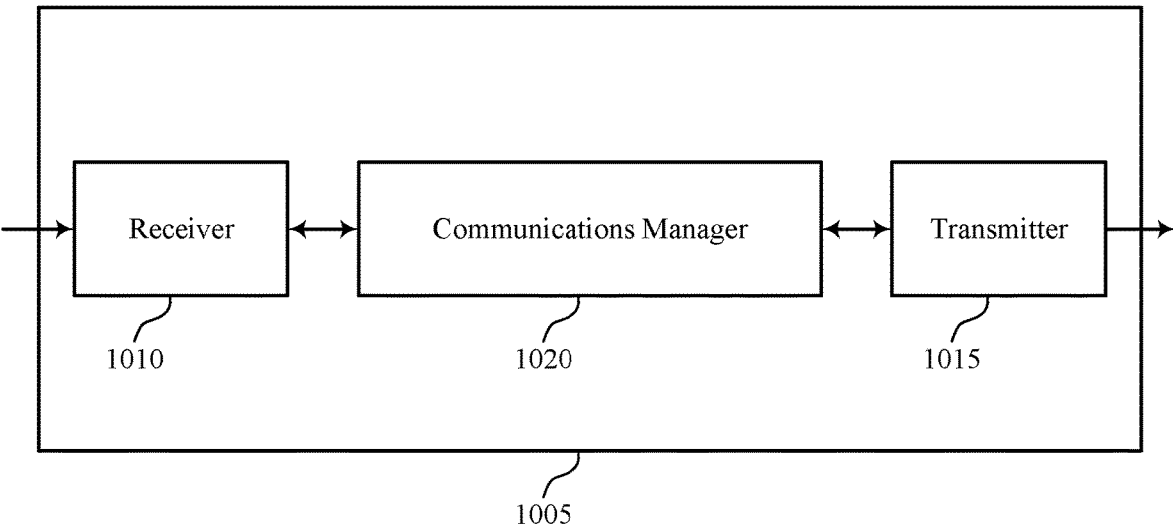
FIGS. 10 and 11 show block diagrams of devices that support uplink spatial relation information in SBFD in accordance with one or more aspects of the present disclosure.

FIG. 10 shows a block diagram 1000 of a device 1005 that supports uplink spatial relation information in SBFD in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of uplink spatial relation information in SBFD as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 is capable of, configured to, or operable to support a means for transmitting, to a UE, first control signaling that indicates one or more uplink beams. The communications manager 1020 is capable of, configured to, or operable to support a means for transmitting, to the UE, second control signaling that schedules an uplink transmission in an SBFD resource, where the second control signaling indicates an uplink beam of the one or more uplink beams for the uplink transmission. The communications manager 1020 is capable of, configured to, or operable to support a means for selectively monitoring for the uplink transmission using the uplink beam in the SBFD resource refraining from monitoring for the uplink transmission in the SBFD resource, where selectively monitoring or refraining from monitoring for the uplink transmission is based on whether the uplink beam is enabled or restricted for SBFD resource type.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
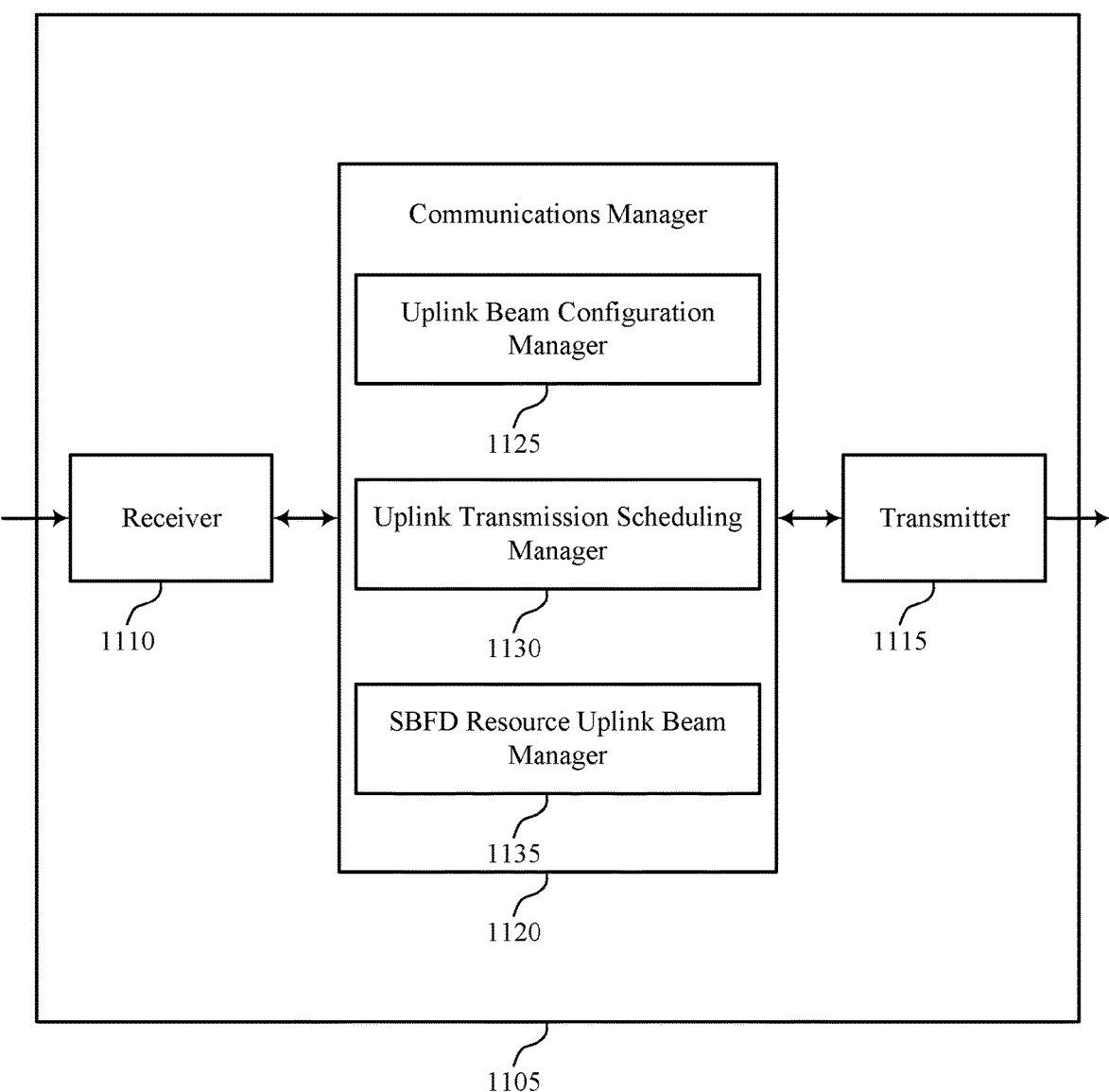

FIG. 11 shows a block diagram 1100 of a device 1105 that supports uplink spatial relation information in SBFD in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of uplink spatial relation information in SBFD as described herein. For example, the communications manager 1120 may include an uplink beam configuration manager 1125, an uplink transmission scheduling manager 1130, an SBFD resource uplink beam manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The uplink beam configuration manager 1125 is capable of, configured to, or operable to support a means for transmitting, to a UE, first control signaling that indicates one or more uplink beams. The uplink transmission scheduling manager 1130 is capable of, configured to, or operable to support a means for transmitting, to the UE, second control signaling that schedules an uplink transmission in an SBFD resource, where the second control signaling indicates an uplink beam of the one or more uplink beams for the uplink transmission. The SBFD resource uplink beam manager 1135 is capable of, configured to, or operable to support a means for selectively monitoring for the uplink transmission using the uplink beam in the SBFD resource refraining from monitoring for the uplink transmission in the SBFD resource, where selectively monitoring or refraining from monitoring for the uplink transmission is based on whether the uplink beam is enabled or restricted for SBFD resource type.

Figure 12:
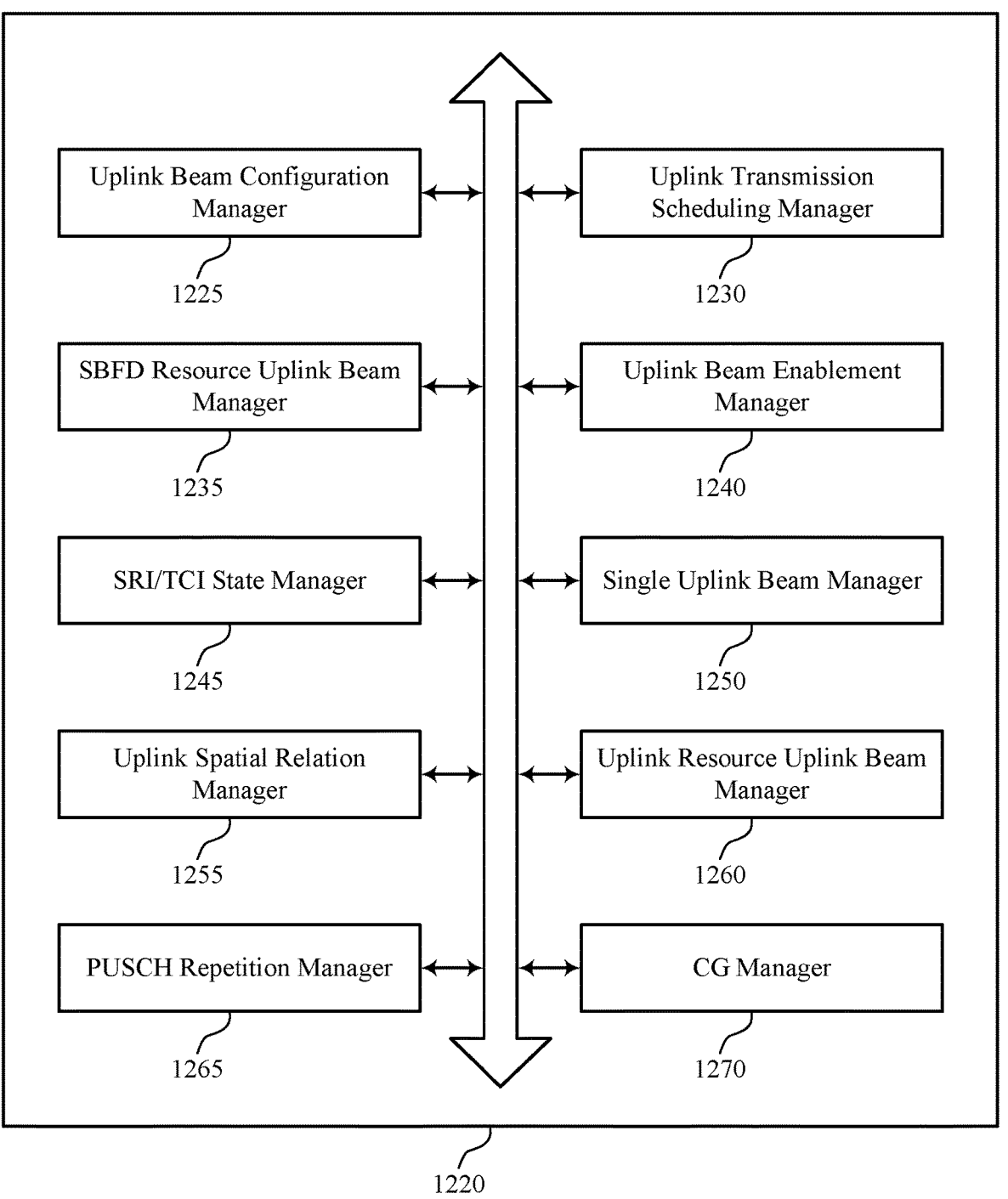
FIG. 12 shows a block diagram of a communications manager that supports uplink spatial relation information in SBFD in accordance with one or more aspects of the present disclosure.

FIG. 12 shows a block diagram 1200 of a communications manager 1220 that supports uplink spatial relation information in SBFD in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of uplink spatial relation information in SBFD as described herein. For example, the communications manager 1220 may include an uplink beam configuration manager 1225, an uplink transmission scheduling manager 1230, an SBFD resource uplink beam manager 1235, an uplink beam enablement manager 1240, an SRI/TCI state manager 1245, a single uplink beam manager 1250, an uplink spatial relation manager 1255, an uplink resource uplink beam manager 1260, an PUSCH repetition manager 1265, a CG manager 1270, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The uplink beam configuration manager 1225 is capable of, configured to, or operable to support a means for transmitting, to a UE, first control signaling that indicates one or more uplink beams. The uplink transmission scheduling manager 1230 is capable of, configured to, or operable to support a means for transmitting, to the UE, second control signaling that schedules an uplink transmission in an SBFD resource, where the second control signaling indicates an uplink beam of the one or more uplink beams for the uplink transmission. The SBFD resource uplink beam manager 1235 is capable of, configured to, or operable to support a means for selectively monitoring for the uplink transmission using the uplink beam in the SBFD resource refraining from monitoring for the uplink transmission in the SBFD resource, where selectively monitoring or refraining from monitoring for the uplink transmission is based on whether the uplink beam is enabled or restricted for SBFD resource type.

In some examples, to support transmitting the first control signaling, the uplink beam configuration manager 1225 is capable of, configured to, or operable to support a means for transmitting an indication that the one or more uplink beams include the uplink beam enabled for the SBFD resource type and a second uplink beam enabled for an uplink resource type.

In some examples, to support transmitting the indication that the one or more uplink beams include the uplink beam enabled for the SBFD resource type and the second uplink beam enabled for the uplink resource type, the uplink spatial relation manager 1255 is capable of, configured to, or operable to support a means for transmitting an indication of a first spatial relation associated with the SBFD resource type and a second spatial relation associated with the uplink resource type, where the first spatial relation is indicative of the uplink beam and the second spatial relation is indicative of the second uplink beam.

In some examples, to support transmitting the indication that the one or more uplink beams include the uplink beam enabled for the SBFD resource type and the second uplink beam enabled for the uplink resource type, the uplink spatial relation manager 1255 is capable of, configured to, or operable to support a means for transmitting an indication of a spatial relation associated with both the SBFD resource type and the uplink resource type, where the spatial relation includes a first reference signal field associated with the SBFD resource type and a second reference signal field associated with the uplink resource type, where the first reference signal field is indicative of the uplink beam and the second reference signal field is indicative of the second uplink beam.

In some examples, the uplink transmission scheduling manager 1230 is capable of, configured to, or operable to support a means for transmitting, to the UE, third control signaling scheduling a second uplink transmission in an uplink resource. In some examples, the SBFD resource uplink beam manager 1235 is capable of, configured to, or operable to support a means for monitoring for the uplink transmission using the uplink beam in the SBFD resource. In some examples, the uplink resource uplink beam manager 1260 is capable of, configured to, or operable to support a means for monitoring for the second uplink transmission using the second uplink beam in the uplink resource.

In some examples, the uplink beam enablement manager 1240 is capable of, configured to, or operable to support a means for transmitting, to the UE, third control signaling indicating the uplink beam is enabled for the SBFD resource type and that a second beam of the one or more uplink beams is enabled for an uplink resource type.

In some examples, to support transmitting the second control signaling, the SRI/TCI state manager 1245 is capable of, configured to, or operable to support a means for transmitting an indication of a first SRI or a first TCI state associated with the SBFD resource type and a second SRI or a second TCI state associated with an uplink resource type, where the first SRI or the first TCI state is indicative of the uplink beam and the second SRI or the second TCI state is indicative of a second uplink beam of the one or more uplink beams, and where the uplink transmission is an uplink shared channel transmission.

In some examples, the PUSCH repetition manager 1265 is capable of, configured to, or operable to support a means for transmitting, with the second control signaling, scheduling information for a set of uplink shared channel repetitions including a first repetition in the SBFD resource and a second repetition in an uplink resource, where the uplink shared channel transmission is the first repetition. In some examples, the SBFD resource uplink beam manager 1235 is capable of, configured to, or operable to support a means for monitoring for the first repetition using the uplink beam in the SBFD resource. In some examples, the uplink resource uplink beam manager 1260 is capable of, configured to, or operable to support a means for monitoring for the second repetition using the second uplink beam in the uplink resource.

In some examples, the CG manager 1270 is capable of, configured to, or operable to support a means for transmitting, to the UE, a CG that schedules the uplink shared channel transmission in the SBFD resource and a second uplink shared channel transmission in an uplink resource, where the uplink shared channel transmission is monitored for using the uplink beam in the SBFD resource, and where the second uplink shared channel transmission is monitored for using the second uplink beam in the uplink resource.

In some examples, the uplink transmission scheduling manager 1230 is capable of, configured to, or operable to support a means for transmitting, with the second control signaling, scheduling information for a second uplink shared channel transmission in an uplink resource, where the second control signaling is a single DCI. In some examples, the SBFD resource uplink beam manager 1235 is capable of, configured to, or operable to support a means for monitoring for the uplink shared channel transmission using the uplink beam in the SBFD resource. In some examples, the uplink resource uplink beam manager 1260 is capable of, configured to, or operable to support a means for monitoring for the second uplink shared channel transmission using the second uplink beam in the uplink resource.

In some examples, the single uplink beam manager 1250 is capable of, configured to, or operable to support a means for monitoring for the uplink transmission using the uplink beam in the SBFD resource, where the one or more uplink beams includes only the uplink beam, and where the uplink beam is enabled for both the SBFD resource type and an uplink resource type.

In some examples, the SBFD resource uplink beam manager 1235 is capable of, configured to, or operable to support a means for refraining from monitoring for the uplink transmission in the SBFD resource, where the one or more uplink beams includes only the uplink beam, and where the uplink beam is enabled for an uplink resource type and is restricted for the SBFD resource type.

In some examples, the SBFD resource uplink beam manager 1235 is capable of, configured to, or operable to support a means for monitoring for the uplink transmission using the uplink beam in the SBFD resource, where the uplink transmission is one of an SRS or an uplink control channel transmission.

Figure 13:
FIG. 13 shows a diagram of a system including a device that supports uplink spatial relation information in SBFD in accordance with one or more aspects of the present disclosure.

FIG. 13 shows a diagram of a system 1300 including a device 1305 that supports uplink spatial relation information in SBFD in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting uplink spatial relation information in SBFD). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links).

For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 is capable of, configured to, or operable to support a means for transmitting, to a UE, first control signaling that indicates one or more uplink beams. The communications manager 1320 is capable of, configured to, or operable to support a means for transmitting, to the UE, second control signaling that schedules an uplink transmission in an SBFD resource, where the second control signaling indicates an uplink beam of the one or more uplink beams for the uplink transmission. The communications manager 1320 is capable of, configured to, or operable to support a means for selectively monitoring for the uplink transmission using the uplink beam in the SBFD resource refraining from monitoring for the uplink transmission in the SBFD resource, where selectively monitoring or refraining from monitoring for the uplink transmission is based on whether the uplink beam is enabled or restricted for SBFD resource type.

By including or configuring the communications manager 1320 in accordance with examples as described herein, the device 1305 may support techniques for improved communication reliability, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of uplink spatial relation information in SBFD as described herein, or the processor 1335 and the memory 1325 may be otherwise configured to perform or support such operations.

FIG. 14 shows a flowchart illustrating a method 1400 that supports uplink spatial relation information in SBFD in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving first control signaling that indicates one or more uplink beams. The operations of 1405 may be performed in accordance with examples as disclosed herein. In some examples, aspects of the operations of 1405 may be performed by an uplink beam configuration manager 825 as described with reference to FIG. 8.

At 1410, the method may include receiving second control signaling that schedules an uplink transmission in an SBFD resource, where the second control signaling indicates an uplink beam of the one or more uplink beams for the uplink transmission. The operations of 1410 may be performed in accordance with examples as disclosed herein. In some examples, aspects of the operations of 1410 may be performed by an uplink transmission scheduling manager 830 as described with reference to FIG. 8.

At 1415, the method may include selectively performing the uplink transmission using the uplink beam in the SBFD resource or cancelling the uplink transmission in the SBFD resource, where selectively performing or cancelling the uplink transmission is based on whether the uplink beam is enabled or restricted for an SBFD resource type. The operations of 1415 may be performed in accordance with examples as disclosed herein. In some examples, aspects of the operations of 1415 may be performed by an SBFD resource uplink beam manager 835 as described with reference to FIG. 8.

FIG. 15 shows a flowchart illustrating a method 1500 that supports uplink spatial relation information in SBFD in accordance with aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1505, the method may include transmitting, to a UE, first control signaling that indicates one or more uplink beams. The operations of 1505 may be performed in accordance with examples as disclosed herein. In some examples, aspects of the operations of 1505 may be performed by an uplink beam configuration manager 1225 as described with reference to FIG. 12.

At 1510, the method may include transmitting, to the UE, second control signaling that schedules an uplink transmission in an SBFD resource, where the second control signaling indicates an uplink beam of the one or more uplink beams for the uplink transmission. The operations of 1510 may be performed in accordance with examples as disclosed herein. In some examples, aspects of the operations of 1510 may be performed by an uplink transmission scheduling manager 1230 as described with reference to FIG. 12.

At 1515, the method may include selectively monitoring for the uplink transmission using the uplink beam in the SBFD resource refraining from monitoring for the uplink transmission in the SBFD resource, where selectively monitoring or refraining from monitoring for the uplink transmission is based on whether the uplink beam is enabled or restricted for SBFD resource type. The operations of 1515 may be performed in accordance with examples as disclosed herein. In some examples, aspects of the operations of 1515 may be performed by an SBFD resource uplink beam manager 1235 as described with reference to FIG. 12.

The following provides an overview of aspects of the present disclosure:

Aspect 1: A method for wireless communications at a UE, comprising: receiving first control signaling that indicates one or more uplink beams: receiving second control signaling that schedules an uplink transmission in a SBFD resource, wherein the second control signaling indicates an uplink beam of the one or more uplink beams for the uplink transmission; and selectively performing the uplink transmission using the uplink beam in the SBFD resource or cancelling the uplink transmission in the SBFD resource, wherein selectively performing or cancelling the uplink transmission is based at least in part on whether the uplink beam is enabled or restricted for a SBFD resource type.

Aspect 2: The method of aspect 1, wherein receiving the first control signaling comprises: receiving an indication that the one or more uplink beams comprise the uplink beam enabled for the SBFD resource type and a second uplink beam enabled for an uplink resource type.

Aspect 3: The method of aspect 2, wherein receiving the indication that the one or more uplink beams comprise the uplink beam enabled for the SBFD resource type and the second uplink beam enabled for the uplink resource type comprises: receiving an indication of a first spatial relation associated with the SBFD resource type and a second spatial relation associated with the uplink resource type, wherein the first spatial relation is indicative of the uplink beam and the second spatial relation is indicative of the second uplink beam.

Aspect 4: The method of aspect 2, wherein receiving the indication that the one or more uplink beams comprise the uplink beam enabled for the SBFD resource type and the second uplink beam enabled for the uplink resource type comprises: receiving an indication of a spatial relation associated with both the SBFD resource type and the uplink resource type, wherein the spatial relation comprises a first reference signal field associated with the SBFD resource type and a second reference signal field associated with the uplink resource type, wherein the first reference signal field is indicative of the uplink beam and the second reference signal field is indicative of the second uplink beam.

Aspect 5: The method of any of aspects 2 through 4, further comprising: receiving third control signaling scheduling a second uplink transmission in an uplink resource: performing the uplink transmission using the uplink beam in the SBFD resource; and performing the second uplink transmission using the second uplink beam in the uplink resource.

Aspect 6: The method of any of aspects 1 through 5, further comprising: receiving third control signaling indicating the uplink beam is enabled for the SBFD resource type and that a second beam of the one or more uplink beams is enabled for an uplink resource type.

Aspect 7: The method of any of aspects 1 through 6, wherein receiving the second control signaling comprises: receiving an indication of a first SRI or a first TCI state associated with the SBFD resource type and a second SRI or a second TCI state associated with an uplink resource type, wherein the first SRI or the first TCI state is indicative of the uplink beam and the second SRI or the second TCI state is indicative of a second uplink beam of the one or more uplink beams, and wherein the uplink transmission is an uplink shared channel transmission.

Aspect 8: The method of aspect 7, further comprising: receiving, with the second control signaling, scheduling information for a set of uplink shared channel repetitions comprising a first repetition in the SBFD resource and a second repetition in an uplink resource, wherein the uplink shared channel transmission is the first repetition: performing the first repetition using the uplink beam in the SBFD resource; and performing the second repetition using the second uplink beam in the uplink resource.

Aspect 9: The method of aspect 7, wherein receiving the second control signaling comprises: receiving a CG that schedules the uplink shared channel transmission in the SBFD resource and a second uplink shared channel transmission in an uplink resource, wherein the uplink shared channel transmission is performed using the uplink beam in the SBFD resource, and wherein the second uplink shared channel transmission is performed using the second uplink beam in the uplink resource.

Aspect 10: The method of aspect 7, further comprising: receiving, with the second control signaling, scheduling information for a second uplink shared channel transmission in an uplink resource, wherein the second control signaling is a single DCI; performing the uplink shared channel transmission using the uplink beam in the SBFD resource; and performing the second uplink shared channel transmission using the second uplink beam in the uplink resource.

Aspect 11: The method of aspect 1, further comprising: performing the uplink transmission using the uplink beam in the SBFD resource, wherein the one or more uplink beams comprises only the uplink beam, and wherein the uplink beam is enabled for both the SBFD resource type and an uplink resource type.

Aspect 12: The method of aspect 1, further comprising: cancelling the uplink transmission in the SBFD resource, wherein the one or more uplink beams comprises only the uplink beam, and wherein the uplink beam is enabled for an uplink resource type and is restricted for the SBFD resource type.

Aspect 13: The method of any of aspects 1 through 6 or 11, further comprising: performing the uplink transmission using the uplink beam in the SBFD resource, wherein the uplink transmission is one of an SRS or an uplink control channel transmission.

Aspect 14: A method for wireless communications at a network entity, comprising: transmitting, to a UE, first control signaling that indicates one or more uplink beams: transmitting, to the UE, second control signaling that schedules an uplink transmission in a SBFD resource, wherein the second control signaling indicates an uplink beam of the one or more uplink beams for the uplink transmission; and selectively monitoring for the uplink transmission using the uplink beam in the SBFD resource refraining from monitoring for the uplink transmission in the SBFD resource, wherein selectively monitoring or refraining from monitoring for the uplink transmission is based at least in part on whether the uplink beam is enabled or restricted for SBFD resource type.

Aspect 15: The method of aspect 14, wherein transmitting the first control signaling comprises: transmitting an indication that the one or more uplink beams comprise the uplink beam enabled for the SBFD resource type and a second uplink beam enabled for an uplink resource type.

Aspect 16: The method of aspect 15, wherein transmitting the indication that the one or more uplink beams comprise the uplink beam enabled for the SBFD resource type and the second uplink beam enabled for the uplink resource type comprises: transmitting an indication of a first spatial relation associated with the SBFD resource type and a second spatial relation associated with the uplink resource type, wherein the first spatial relation is indicative of the uplink beam and the second spatial relation is indicative of the second uplink beam.

Aspect 17: The method of aspect 15, wherein transmitting the indication that the one or more uplink beams comprise the uplink beam enabled for the SBFD resource type and the second uplink beam enabled for the uplink resource type comprises: transmitting an indication of a spatial relation associated with both the SBFD resource type and the uplink resource type, wherein the spatial relation comprises a first reference signal field associated with the SBFD resource type and a second reference signal field associated with the uplink resource type, wherein the first reference signal field is indicative of the uplink beam and the second reference signal field is indicative of the second uplink beam.

Aspect 18: The method of any of aspects 15 through 17, further comprising: transmitting, to the UE, third control signaling scheduling a second uplink transmission in an uplink resource: monitoring for the uplink transmission using the uplink beam in the SBFD resource; and monitoring for the second uplink transmission using the second uplink beam in the uplink resource.

Aspect 19: The method of any of aspects 14 through 18, further comprising: transmitting, to the UE, third control signaling indicating the uplink beam is enabled for the SBFD resource type and that a second beam of the one or more uplink beams is enabled for an uplink resource type.

Aspect 20: The method of any of aspects 14 through 19, wherein transmitting the second control signaling comprises: transmitting an indication of a first SRI or a first TCI state associated with the SBFD resource type and a second SRI or a second TCI state associated with an uplink resource type, wherein the first SRI or the first TCI state is indicative of the uplink beam and the second SRI or the second TCI state is indicative of a second uplink beam of the one or more uplink beams, and wherein the uplink transmission is an uplink shared channel transmission.

Aspect 21: The method of aspect 20, further comprising: transmitting, with the second control signaling, scheduling information for a set of uplink shared channel repetitions comprising a first repetition in the SBFD resource and a second repetition in an uplink resource, wherein the uplink shared channel transmission is the first repetition: monitoring for the first repetition using the uplink beam in the SBFD resource; and monitoring for the second repetition using the second uplink beam in the uplink resource.

Aspect 22: The method of aspect 20, further comprising: transmitting, to the UE, a CG that schedules the uplink shared channel transmission in the SBFD resource and a second uplink shared channel transmission in an uplink resource, wherein the uplink shared channel transmission is monitored for using the uplink beam in the SBFD resource, and wherein the second uplink shared channel transmission is monitored for using the second uplink beam in the uplink resource.

Aspect 23: The method of aspect 20, further comprising: transmitting, with the second control signaling, scheduling information for a second uplink shared channel transmission in an uplink resource, wherein the second control signaling is a single DCI; monitoring for the uplink shared channel transmission using the uplink beam in the SBFD resource; and monitoring for the second uplink shared channel transmission using the second uplink beam in the uplink resource.

Aspect 24: The method of aspect 14, further comprising: monitoring for the uplink transmission using the uplink beam in the SBFD resource, wherein the one or more uplink beams comprises only the uplink beam, and wherein the uplink beam is enabled for both the SBFD resource type and an uplink resource type.

Aspect 25: The method of aspect 14, further comprising: refraining from monitoring for the uplink transmission in the SBFD resource, wherein the one or more uplink beams comprises only the uplink beam, and wherein the uplink beam is enabled for an uplink resource type and is restricted for the SBFD resource type.

Aspect 26: The method of any of aspects 14 through 19 or 24, further comprising: monitoring for the uplink transmission using the uplink beam in the SBFD resource, wherein the uplink transmission is one of an SRS or an uplink control channel transmission.

Aspect 27: A UE for wireless communications, comprising one or more memories storing processor-executable code, and one or more processors coupled with the one or more memories and individually or collectively operable to execute the code to cause the UE to perform a method of any of aspects 1 through 13.

Aspect 28: An apparatus for wireless communications at a UE, comprising at least one means for performing a method of any of aspects 1 through 13.

Aspect 29: A non-transitory computer-readable medium storing code for wireless communications at a UE, the code comprising instructions executable by a processor to perform a method of any of aspects 1 through 13.

Aspect 30: A network entity for wireless communications, comprising one or more memories storing processor-executable code, and one or more processors coupled with the one or more memories and individually or collectively operable to execute the code to cause the network entity to perform a method of any of aspects 14 through 26.

Aspect 31: An apparatus for wireless communications at a network entity, comprising at least one means for performing a method of any of aspects 14 through 26.

Aspect 32: A non-transitory computer-readable medium storing code for wireless communications at a network entity, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   one or more memories storing processor-executable code; and
   one or more processors coupled with the one or more memories and individually or collectively operable to execute the code to cause the UE to:
      receive first control signaling that indicates one or more uplink beams;
      receive second control signaling that schedules an uplink transmission in a subband full duplex resource, wherein the second control signaling indicates an uplink beam of the one or more uplink beams for the uplink transmission; and
      selectively perform the uplink transmission using the uplink beam in the subband full duplex resource or cancel the uplink transmission in the subband full duplex resource, wherein selectively performing or cancelling the uplink transmission is based at least in part on whether the uplink beam is enabled or restricted for a subband full duplex resource type.

2. The UE of claim 1, wherein, to receive the first control signaling, the one or more processors are individually or collectively operable to execute the code to cause the UE to:

receive an indication that the one or more uplink beams comprise the uplink beam enabled for the subband full duplex resource type and a second uplink beam enabled for an uplink resource type.

3. The UE of claim 2, wherein, to receive the indication that the one or more uplink beams comprise the uplink beam enabled for the subband full duplex resource type and the second uplink beam enabled for the uplink resource type, the one or more processors are individually or collectively operable to execute the code to cause the UE to:

receive an indication of a first spatial relation associated with the subband full duplex resource type and a second spatial relation associated with the uplink resource type, wherein the first spatial relation is indicative of the uplink beam and the second spatial relation is indicative of the second uplink beam.

4. The UE of claim 2, wherein, to receive the indication that the one or more uplink beams comprise the uplink beam enabled for the subband full duplex resource type and the second uplink beam enabled for the uplink resource type, the one or more processors are individually or collectively operable to execute the code to cause the UE to:

receive an indication of a spatial relation associated with both the subband full duplex resource type and the uplink resource type, wherein the spatial relation comprises a first reference signal field associated with the subband full duplex resource type and a second reference signal field associated with the uplink resource type, wherein the first reference signal field is indicative of the uplink beam and the second reference signal field is indicative of the second uplink beam.

5. The UE of claim 2, wherein the one or more processors are individually or collectively further operable to execute the code to cause the UE to:

receive third control signaling scheduling a second uplink transmission in an uplink resource;

perform the uplink transmission using the uplink beam in the subband full duplex resource; and perform the second uplink transmission using the second uplink beam in the uplink resource.

6. The UE of claim 1, wherein the one or more processors are individually or collectively further operable to execute the code to cause the UE to:

receive third control signaling indicating the uplink beam is enabled for the subband full duplex resource type and that a second beam of the one or more uplink beams is enabled for an uplink resource type.

7. The UE of claim 1, wherein, to receive the second control signaling, the one or more processors are individually or collectively operable to execute the code to cause the UE to:

receive an indication of a first sounding reference signal resource indicator or a first transmission configuration indicator state associated with the subband full duplex resource type and a second sounding reference signal resource indicator or a second transmission configuration indicator state associated with an uplink resource type, wherein the first sounding reference signal resource indicator or the first transmission configuration indicator state is indicative of the uplink beam and the second sounding reference signal resource indicator or the second transmission configuration indicator state is indicative of a second uplink beam of the one or more uplink beams, and wherein the uplink transmission is an uplink shared channel transmission.

8. The UE of claim 7, wherein the one or more processors are individually or collectively further operable to execute the code to cause the UE to:

receive, with the second control signaling, scheduling information for a set of uplink shared channel repetitions comprising a first repetition in the subband full duplex resource and a second repetition in an uplink resource, wherein the uplink shared channel transmission is the first repetition;

perform the first repetition using the uplink beam in the subband full duplex resource; and perform the second repetition using the second uplink beam in the uplink resource.

9. The UE of claim 7, wherein, to receive the second control signaling, the one or more processors are individually or collectively further operable to execute the code to cause the UE to:

receive a configured grant that schedules the uplink shared channel transmission in the subband full duplex resource and a second uplink shared channel transmission in an uplink resource, wherein the uplink shared channel transmission is performed using the uplink beam in the subband full duplex resource, and wherein the second uplink shared channel transmission is performed using the second uplink beam in the uplink resource.

10. The UE of claim 7, wherein the one or more processors are individually or collectively further operable to execute the code to cause the UE to:

receive, with the second control signaling, scheduling information for a second uplink shared channel transmission in an uplink resource, wherein the second control signaling is a single downlink control information;

perform the uplink shared channel transmission using the uplink beam in the subband full duplex resource; and perform the second uplink shared channel transmission using the second uplink beam in the uplink resource.

11. The UE of claim 1, wherein the one or more processors are individually or collectively further operable to execute the code to cause the UE to:

perform the uplink transmission using the uplink beam in the subband full duplex resource, wherein the one or more uplink beams comprises only the uplink beam, and wherein the uplink beam is enabled for both the subband full duplex resource type and an uplink resource type.

12. The UE of claim 1, wherein the one or more processors are individually or collectively further operable to execute the code to cause the UE to:

cancel the uplink transmission in the subband full duplex resource, wherein the one or more uplink beams comprises only the uplink beam, and wherein the uplink beam is enabled for an uplink resource type and is restricted for the subband full duplex resource type.

13. The UE of claim 1, wherein the one or more processors are individually or collectively further operable to execute the code to cause the UE to:

perform the uplink transmission using the uplink beam in the subband full duplex resource, wherein the uplink transmission is one of a sounding reference signal or an uplink control channel transmission.

14. A network entity for wireless communication, comprising:

one or more memories storing processor-executable code; and one or more processors coupled with the one or more memories and individually or collectively operable to execute the code to cause the network entity to:

transmit, to a user equipment (UE), first control signaling that indicates one or more uplink beams;

transmit, to the UE, second control signaling that schedules an uplink transmission in a subband full duplex resource, wherein the second control signaling indicates an uplink beam of the one or more uplink beams for the uplink transmission; and selectively monitor for the uplink transmission using the uplink beam in the subband full duplex resource or refrain from monitoring for the uplink transmission in the subband full duplex resource, wherein selectively monitoring or refraining from monitoring for the uplink transmission is based at least in part on whether the uplink beam is enabled or restricted for subband full duplex resource type.

15. The network entity of claim 14, wherein, to transmit the first control signaling, the one or more processors are individually or collectively operable to execute the code to cause the network entity to:

transmit an indication that the one or more uplink beams comprise the uplink beam enabled for the subband full duplex resource type and a second uplink beam enabled for an uplink resource type.

16. The network entity of claim 15, wherein, to transmit the indication that the one or more uplink beams comprise the uplink beam enabled for the subband full duplex resource type and the second uplink beam enabled for the uplink resource type, the one or more processors are individually or collectively operable to execute the code to cause the network entity to:

transmit an indication of a first spatial relation associated with the subband full duplex resource type and a second spatial relation associated with the uplink resource type, wherein the first spatial relation is indicative of the uplink beam and the second spatial relation is indicative of the second uplink beam.

17. The network entity of claim 15, wherein, to transmit the indication that the one or more uplink beams comprise the uplink beam enabled for the subband full duplex resource type and the second uplink beam enabled for the uplink resource type, the one or more processors are individually or collectively operable to execute the code to cause the network entity to:

transmit an indication of a spatial relation associated with both the subband full duplex resource type and the uplink resource type, wherein the spatial relation comprises a first reference signal field associated with the subband full duplex resource type and a second reference signal field associated with the uplink resource type, wherein the first reference signal field is indicative of the uplink beam and the second reference signal field is indicative of the second uplink beam.

18. The network entity of claim 15, wherein the one to more processors are individually or collectively further operable to execute the code to cause the network entity to:

transmit, to the UE, third control signaling scheduling a second uplink transmission in an uplink resource;

monitor for the uplink transmission using the uplink beam in the subband full duplex resource; and monitor for the second uplink transmission using the second uplink beam in the uplink resource.

19. The network entity of claim 14, wherein the one or more processors are individually or collectively further operable to execute the code to cause the network entity to:

transmit, to the UE, third control signaling indicating the uplink beam is enabled for the subband full duplex resource type and that a second beam of the one or more uplink beams is enabled for an uplink resource type.

20. The network entity of claim 14, wherein, to transmit the second control signaling, the one or more processors are individually or collectively operable to execute the code to cause the network entity to:

transmit an indication of a first sounding reference signal resource indicator or a first transmission configuration indicator state associated with the subband full duplex resource type and a second sounding reference signal resource indicator or a second transmission configuration indicator state associated with an uplink resource type, wherein the first sounding reference signal resource indicator or the first transmission configuration indicator state is indicative of the uplink beam and the second sounding reference signal resource indicator or the second transmission configuration indicator state is indicative of a second uplink beam of the one or more uplink beams, and wherein the uplink transmission is an uplink shared channel transmission.

21. The network entity of claim 20, wherein the one or more processors are individually or collectively further operable to execute the code to cause the network entity to:

transmit, with the second control signaling, scheduling information for a set of uplink shared channel repetitions comprising a first repetition in the subband full duplex resource and a second repetition in an uplink resource, wherein the uplink shared channel transmission is the first repetition;

monitor for the first repetition using the uplink beam in the subband full duplex resource; and monitor for the second repetition using the second uplink beam in the uplink resource.

22. The network entity of claim 20, wherein the one or more processors are individually or collectively further operable to execute the code to cause the network entity to:

transmit, to the UE, a configured grant that schedules the uplink shared channel transmission in the subband full duplex resource and a second uplink shared channel transmission in an uplink resource, wherein the uplink shared channel transmission is monitored for using the uplink beam in the subband full duplex resource, and wherein the second uplink shared channel transmission is monitored for using the second uplink beam in the uplink resource.

23. The network entity of claim 20, wherein the one or more processors are individually or collectively further operable to execute the code to cause the network entity to:

transmit, with the second control signaling, scheduling information for a second uplink shared channel transmission in an uplink resource, wherein the second control signaling is a single downlink control information;

monitor for the uplink shared channel transmission using the uplink beam in the subband full duplex resource; and monitor for the second uplink shared channel transmission using the second uplink beam in the uplink resource.

24. The network entity of claim 14, wherein the one or more processors are individually or collectively further operable to execute the code to cause the network entity to:

monitor for the uplink transmission using the uplink beam in the subband full duplex resource, wherein the one or more uplink beams comprises only the uplink beam, and wherein the uplink beam is enabled for both the subband full duplex resource type and an uplink resource type.

25. The network entity of claim 14, wherein the one or more processors are individually or collectively further operable to execute the code to cause the network entity to:

refrain from monitoring for the uplink transmission in the subband full duplex resource, wherein the one or more uplink beams comprises only the uplink beam, and wherein the uplink beam is enabled for an uplink resource type and is restricted for the subband full duplex resource type.

26. The network entity of claim 14, wherein the one or more processors are individually or collectively further operable to execute the code to cause the network entity to:

monitor for the uplink transmission using the uplink beam in the subband full duplex resource, wherein the uplink transmission is one of a sounding reference signal or an uplink control channel transmission.

27. A method for wireless communications by a user equipment (UE), comprising:

receiving first control signaling that indicates one or more uplink beams;

receiving second control signaling that schedules an uplink transmission in a subband full duplex resource, wherein the second control signaling indicates an uplink beam of the one or more uplink beams for the uplink transmission; and selectively performing the uplink transmission using the uplink beam in the subband full duplex resource or cancelling the uplink transmission in the subband full duplex resource, wherein selectively performing or cancelling the uplink transmission is based at least in part on whether the uplink beam is enabled or restricted for a subband full duplex resource type.

28. The method of claim 27, wherein receiving the first control signaling comprises:

receiving an indication that the one or more uplink beams comprise the uplink beam enabled for the subband full duplex resource type and a second uplink beam enabled for an uplink resource type.

29. A method for wireless communications by a network entity, comprising:

transmitting, to a user equipment (UE), first control signaling that indicates one or more uplink beams;

transmitting, to the UE, second control signaling that schedules an uplink transmission in a subband full duplex resource, wherein the second control signaling indicates an uplink beam of the one or more uplink beams for the uplink transmission; and selectively monitoring for the uplink transmission using the uplink beam in the subband full duplex resource or refraining from monitoring for the uplink transmission in the subband full duplex resource, wherein selectively monitoring or refraining from monitoring for the uplink transmission is based at least in part on whether the uplink beam is enabled or restricted for subband full duplex resource type.

30. The method of claim 29, wherein transmitting the first control signaling comprises:

transmitting an indication that the one or more uplink beams comprise the uplink beam enabled for the subband full duplex resource type and a second uplink beam enabled for an uplink resource type.

* * * * *